(12) United States Patent
Casaccia et al.

(10) Patent No.: US 8,477,673 B2
(45) Date of Patent: Jul. 2, 2013

(54) CELL SPECIFIC RETRANSMISSION OF SINGLE FREQUENCY NETWORK MBMS DATA

(75) Inventors: Lorenzo Casaccia, Rome (IT); Nathan E. Tenny, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 883 days.

(21) Appl. No.: 11/760,645

(22) Filed: Jun. 8, 2007

(65) Prior Publication Data

US 2008/0025240 A1 Jan. 31, 2008

Related U.S. Application Data

(60) Provisional application No. 60/812,248, filed on Jun. 9, 2006.

(51) Int. Cl.
*H04H 20/71* (2008.01)

(52) U.S. Cl.
USPC ........... 370/312; 370/324; 370/350; 370/503; 370/509; 370/510; 370/512; 370/514; 370/343; 455/449; 455/101; 455/450; 455/451; 455/452.1; 455/464

(58) Field of Classification Search
USPC .............. 455/101, 449, 502, 450, 451, 452.1, 455/464; 370/312, 324, 350, 503, 509, 510, 370/512, 514, 343
See application file for complete search history.

(56) References Cited

U.S. PATENT DOCUMENTS

| 5,838,668 | A  | 11/1998 | Okada et al. |
| 6,307,846 | B1 | 10/2001 | Willey |
| 6,393,003 | B1 | 5/2002  | Lee |
| 6,546,251 | B1 | 4/2003  | Dalsgaard et al. |
| 6,987,749 | B2 | 1/2006  | Cai et al. |
| 7,372,831 | B2 | 5/2008  | Kim et al. |
| 2001/0026560 | A1 | 10/2001 | Bellier et al. |
| 2002/0055360 | A1 | 5/2002  | Chen et al. |
| 2003/0012195 | A1 | 1/2003  | Ohkubo et al. |
| 2004/0087320 | A1 | 5/2004  | Kim et al. |

(Continued)

FOREIGN PATENT DOCUMENTS

| EP | 1387591 A1 | 2/2004 |
| JP | 8340351 A  | 12/1996 |

(Continued)

OTHER PUBLICATIONS

3GPP TSG-RAN WG1 #42, R1-050901, Aug. 29-Sep. 2, 2005, pp. 1-4.*

(Continued)

*Primary Examiner* — Kamran Afshar
*Assistant Examiner* — Khalid Shaheed
(74) *Attorney, Agent, or Firm* — John J. Ketchum

(57) ABSTRACT

Providing for retransmission of SFN data, including SFN operated MBMS data, in a manner that preserves synchronization of scheduled SFN transmissions is disclosed herein. As an example, SFN data can be transmitted in a first allocation period, and an un-received or indecipherable SFN data packet associated with the SFN data can be scheduled in a second allocation period. More particularly, the un-received or indecipherable SFN data packet can be allocated to a block of the second allocation period that is scheduled for non-SFN transmission, for instance. Accordingly, SFN retransmission can take place on a cell by cell basis without substantially affecting SFN transmissions synchronized among the cells.

61 Claims, 20 Drawing Sheets

U.S. PATENT DOCUMENTS

| | | | |
|---|---|---|---|
| 2004/0229624 A1* | 11/2004 | Cai et al. ..................... 455/449 |
| 2005/0053035 A1 | 3/2005 | Kwak et al. |
| 2005/0250497 A1 | 11/2005 | Ghosh et al. |
| 2006/0198325 A1 | 9/2006 | Gao et al. |
| 2007/0086370 A1 | 4/2007 | Jang et al. |
| 2008/0019307 A1 | 1/2008 | Tenny et al. |
| 2009/0047912 A1 | 2/2009 | Lee et al. |

FOREIGN PATENT DOCUMENTS

| | | |
|---|---|---|
| JP | 2004511127 A | 4/2004 |
| JP | 2007500483 A | 1/2007 |
| JP | 2008515284 A | 5/2008 |
| RU | 2262196 | 2/2005 |
| RU | 2003132424 | 4/2005 |
| WO | WO0227989 A1 | 4/2002 |
| WO | 2004042963 | 5/2004 |
| WO | 2005018144 | 2/2005 |
| WO | 2005046125 | 5/2005 |
| WO | 2005112328 | 11/2005 |
| WO | WO2006036759 A1 | 4/2006 |

OTHER PUBLICATIONS

3GPP TR 25.814 v1.4.0, (May 2006), 3rd Generation Partnership Project, Release 7, pp. 1-121.*

International Search Report—PCT/US07/070909, International Search Authority—European Patent Office—Dec. 21, 2007.

Santella, et al.: "Single Frequency Network (SFN) Planning for Digital Terrestrial Television and Radio Broadcast Services: The Italian Frequency Plan for T-DAB" IEEE Vehicular Technology Conference in Milan, Italy, vol. 4, May 17, 2004,-May 19, 2004 pp. 2307-2311, XP0107766570, Piscataway, USA, ISBN: 0/7803-8255-2, Section I.

Written Opinion—PCT/US2007/070909, internationai Search Authority, European Patent Office, Dec. 21, 2007.

Taiwan Search Report—TW096121009—TIPO—Mar. 24, 2011.

* cited by examiner

CELL SPECIFIC RETRANSMISSION OF SINGLE FREQUENCY NETWORK MBMS DATA

RELATED APPLICATIONS

The present application claims the benefit of U.S. Provisional Patent Application Ser. No. 60/812,248 filed on Jun. 9, 2006, titled "METHOD AND APPARATUS FOR RETRANSMISSION IN WIRELESS COMMUNICATIONS" which is hereby expressly incorporated by reference.

BACKGROUND

1. Field

The following description relates generally to wireless communications, and more particularly to retransmission of multimedia broadcast multicast services for a single frequency network (SFN), in a manner that maintains synchronized SFN transmission.

2. Background

Wireless communication systems have become prevalent in facilitating an emergence of worldwide communication utilizing portable, hand-held devices. Such devices have become smaller and more powerful in order to meet consumer needs, improve communication quality and clarity, and compete with traditional communication devices for providing multi-media services. An increase in processing power and network bandwidth has fueled such competition, but has also increased demand on wireless network operators and operator equipment.

One mechanism to facilitate high bandwidth communication for multi-media has been single frequency network (SFN) operation. Particularly, multimedia broadcast multicast services (MBMS) and MBMS for third generation partnership project (3GPP) long term evolution (LTE), also known as E-MBMS (including, e.g. what has recently come to be known as multicast/broadcast single frequency network MBSFN in the LTE context), can utilize such SFN operation. SFNs utilize radio transmitters, such as enhanced Node (eNode) base stations (Bs), to communicate with subscriber devices. Particularly, groups of eNode Bs can transmit bi-directional information in a tightly synchronized manner, so that signals reinforce one another rather than interfere with each other. As a result, competitive high bandwidth communication can be maintained for E-MBMS services.

On occasion, SFN data transmitted to one or more devices can be undecipherable, or simply lost. Such data must be retransmitted by a wireless network for a service to be maintained. Retransmission poses additional problems, however. For example, retransmission can take place over an entire SFN cell group, requiring every eNode B to retransmit the same block(s) of data. Coordinated retransmission consumes a large amount of bandwidth and a large amount of power. Additional problems occur as well, in that all eNode Bs have to determine which blocks are required by any device and what radio resources should be allocated to retransmission. Coordination among many eNode Bs consumes additional processing power as well. Consequently, wireless communication providers have conducted research into providing alternative mechanisms for retransmitting data.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with various aspects described herein, retransmission of single frequency network (SFN) data is provided in a manner that preserves synchronization of SFN transmissions. As an example, SFN data can be transmitted in a first allocation period, and an un-received or indecipherable SFN data packet associated with the SFN data can be scheduled in a second allocation period. As a more particular example, the un-received or indecipherable SFN data packet can be allocated to a block of the second allocation period that is scheduled for non-SFN transmission. Accordingly, SFN retransmission can take place on a cell by cell basis without substantially affecting SFN transmissions synchronized among the cells. It should be appreciated that SFN data can also include multimedia broadcast multicast service (MBMS) data, MBMS for third generation partnership project (3GPP) long term evolution (LTE) related data (e.g. also known as E-MBMS), and/or multicast/broadcast single frequency network (MBSFN) data, or the like.

According to related aspects, a method for providing retransmission of single frequency network (SFN) data is disclosed. The method comprises transmitting SFN data during a segment of a transmission allocation period, wherein the SFN data can be synchronized among a plurality of transmitters. The method also comprises scheduling an un-received or indecipherable SFN data packet for retransmission during a second segment of the transmission allocation period or during a segment of a subsequent transmission allocation period.

Another aspect relates to an apparatus that facilitates retransmission of SFN data. The apparatus comprises a means for synchronizing SFN data packets scheduled for transmission during a first or a subsequent allocation period among a plurality of transmitters. The apparatus can also comprise a means for scheduling retransmission of an un-received SFN data packet during the first or the subsequent allocation period in a manner that does not affect synchronized transmission of SFN data packets. For instance, the un-received SFN data packet can be scheduled to a portion of the first or the subsequent allocation period allocated to non-SFN data, as needed on a cell by cell basis.

According to another aspect, an apparatus is disclosed that facilitates retransmission of an SFN data packet in a wireless communication environment. The apparatus comprises a data evaluator that synchronizes SFN data packets scheduled for transmission during a first or subsequent allocation period among a plurality of transmitters. The apparatus can also comprise a feedback respondent that schedules retransmission of an un-received SFN data packet during the first or the subsequent allocation period in a manner that maintains synchronized transmission of SFN data. For instance, the un-received SFN data packet can be scheduled during a portion previously allocated to non-SFN data, as needed on a cell by cell basis.

Another aspect relates to a processor for facilitating retransmission of SFN data in a wireless communication environment. The processor can comprise a means for synchronizing SFN data packets scheduled for transmission during a first or a subsequent allocation period among a plurality of transmitters. The processor can also comprise a means for receiving feedback related to an un-received SFN data packet. Furthermore, the processor can comprise a means for scheduling retransmission of the un-received SFN data packet during the first or the subsequent allocation period in a manner that maintains synchronized transmission of SFN data packets.

Another aspect relates to a computer program product for facilitating retransmission of SFN data packets that comprises a computer-readable medium that includes codes executable by at least one computer. The computer codes can cause a computer to transmit SFN data during a first segment of a transmission allocation period, receive feedback data related to an un-received or indecipherable SFN data packet associated with the SFN data, and schedule the un-received or indecipherable SFN data packet for retransmission during a second segment of the transmission allocation period or a segment of a second transmission allocation period. In addition, the SFN data packet can be scheduled in a manner that maintains synchronized transmission of SFN data. Furthermore, the second transmission allocation period can be transmitted by the computer subsequent to the transmission allocation period.

According to another aspect is a method for consuming retransmitted SFN data in a wireless network environment. The method comprises receiving SFN data, synchronized among a plurality of transmitters, during a first segment of a transmission allocation period from one or more of the plurality of transmitters. The method can also comprise incorporating an un-received or indecipherable SFN data packet, associated with SFN data transmitted during the first segment of the transmission allocation period, and subsequently received during a second segment of the transmission allocation period or a segment of a subsequent transmission allocation period, into the SFN data packets received during the first segment.

Another aspect relates to an apparatus that consumes retransmitted SFN data in a wireless network environment. The apparatus can comprise a means for receiving SFN data packets, synchronized among a plurality of transmitters and scheduled for transmission during a first allocation period, from one or more of the plurality of transmitters. Furthermore, the apparatus can comprise a means for incorporating an un-received SFN data packet, associated with the SFN data packets received during the first allocation period, and subsequently received during a subsequent portion of the first allocation period or during a subsequent allocation period, into the SFN data packets received during the first allocation period.

Another aspect relates to an apparatus that consumes retransmitted SFN data. The apparatus comprises a receiver that receives SFN data packets, synchronized among a plurality of transmitters and scheduled for transmission during a first allocation period, from one or more of the plurality of transmitters. The apparatus can also comprise a data organizer that incorporates an un-received SFN data packet, associated with the SFN data packets transmitted during the first allocation period, and subsequently received at the receiver during a subsequent portion of the first allocation period or during a subsequent allocation period, into the SFN data packets received during the first allocation period.

In accord with additional aspects is a processor for consuming retransmitted SFN data packets. The processor can comprise a means for receiving SFN data packets, synchronized among a plurality of transmitters and scheduled for transmission during a first allocation period, from one or more of the plurality of transmitters. Additionally, the processor can comprise a means for providing feedback data related to an un-received SFN data packet. Furthermore, the processor can comprise a means for incorporating the un-received SFN data packet received during a subsequent portion of the first allocation period or during a subsequent allocation period, into the SFN data packets received during the first allocation period.

In accordance with further aspects is a computer program product for consuming retransmitted SFN data packets related to MBMS services, that comprises a computer-readable medium comprising codes executable by at least one computer. The codes can cause a computer to receive SFN data packets, provide feedback data related to an un-received or indecipherable SFN data packet, and incorporate the un-received SFN data packet, received during a subsequent transmission or subsequent portion of a first transmission, associated with SFN data received during a first allocation period.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

DETAILED DESCRIPTION

Figure 1:
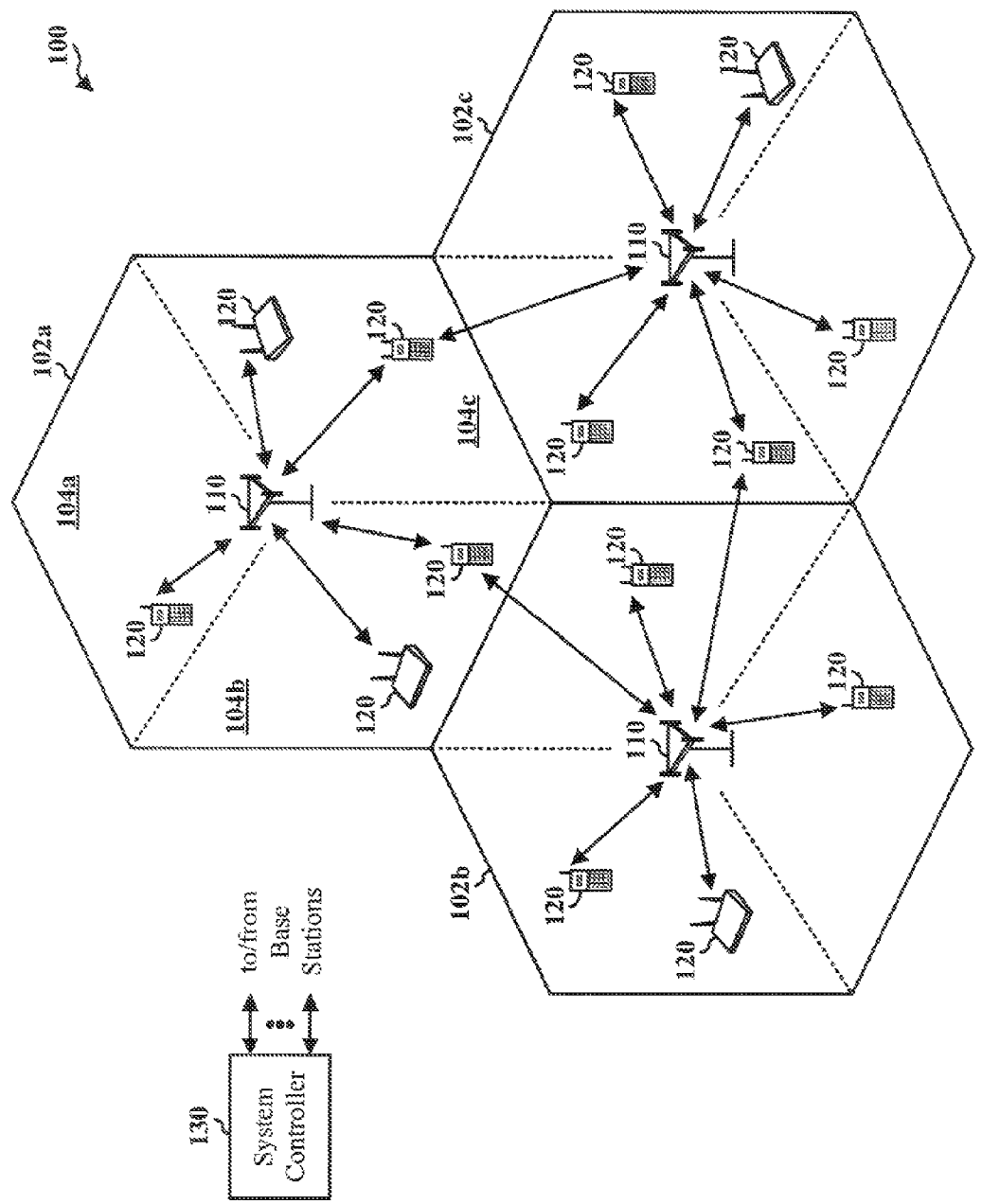
FIG. 1 illustrates a wireless communication system with multiple base stations and multiple terminals, such as may be utilized in conjunction with one or more aspects.

Various aspects are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

In addition, various aspects of the disclosure are described below. It should be apparent that the teaching herein may be embodied in a wide variety of forms and that any specific structure and/or function disclosed herein is merely representative. Based on the teachings herein one skilled in the art should appreciate that an aspect disclosed herein may be implemented independently of any other aspects and that two or more of these aspects may be combined in various ways. For example, an apparatus may be implemented and/or a method practiced using any number of the aspects set forth herein. In addition, an apparatus may be implemented and/or a method practiced using other structure and/or functionality in addition to or other than one or more of the aspects set forth herein. As an example, many of the methods, devices, systems and apparatuses described herein are described in the context of an ad-hoc or unplanned/semi-planned deployed wireless communication environment that provides synchronized transmission and retransmission of SFN data. One skilled in the art should appreciate that similar techniques could apply to other communication environments.

As used in this application, the terms "component," "system," and the like are intended to refer to a computer-related entity, either hardware, software, software in execution, firmware, middle ware, microcode, and/or any combination thereof. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complemented by additional components in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a subscriber station. A subscriber station can also be called a system, a subscriber unit, mobile station, mobile, remote station, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

FIG. 1 illustrates a wireless communication system 100 with multiple base stations 110 and multiple terminals 120, such as may be utilized in conjunction with one or more aspects. A base station is generally a fixed station that communicates with the terminals and may also be called an access point, a Node B, or some other terminology. Each base station 110 provides communication coverage for a particular geographic area, illustrated as three geographic areas, labeled 102a, 102b, and 102c. The term "cell" can refer to a base station and/or its coverage area depending on the context in which the term is used. To improve system capacity, a base station coverage area may be partitioned into multiple smaller areas (e.g., three smaller areas, according to cell 102a in FIG. 1), 104a, 104b, and 104c. Each smaller area can be served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The transmission techniques described herein may be used for a system with sectorized cells as well as a system with un-sectorized cells. For simplicity, in the following description, the term "base station" is used generically for a fixed station that serves a sector as well as a fixed station that serves a cell.

Terminals 120 are typically dispersed throughout the system, and each terminal may be fixed or mobile. A terminal may also be called a mobile station, user equipment, a user device, or some other terminology. A terminal may be a wireless device, a cellular phone, a personal digital assistant (PDA), a wireless modem card, and so on. Each terminal 120 may communicate with zero, one, or multiple base stations on the downlink and uplink at any given moment. The downlink (or forward link) refers to the communication link from the base stations to the terminals, and the uplink (or reverse link) refers to the communication link from the terminals to the base stations.

For a centralized architecture, a system controller 130 couples to base stations 110 and provides coordination and control for base stations 110. For a distributed architecture, base stations 110 may communicate with one another as needed. Data transmission on the forward link occurs from one access point to one access terminal at or near the maximum data rate that can be supported by the forward link and/or the communication system. Additional channels of the forward link (e.g., control channel) may be transmitted from multiple access points to one access terminal. Reverse link data communication may occur from one access terminal to one or more access points.

Figure 2:
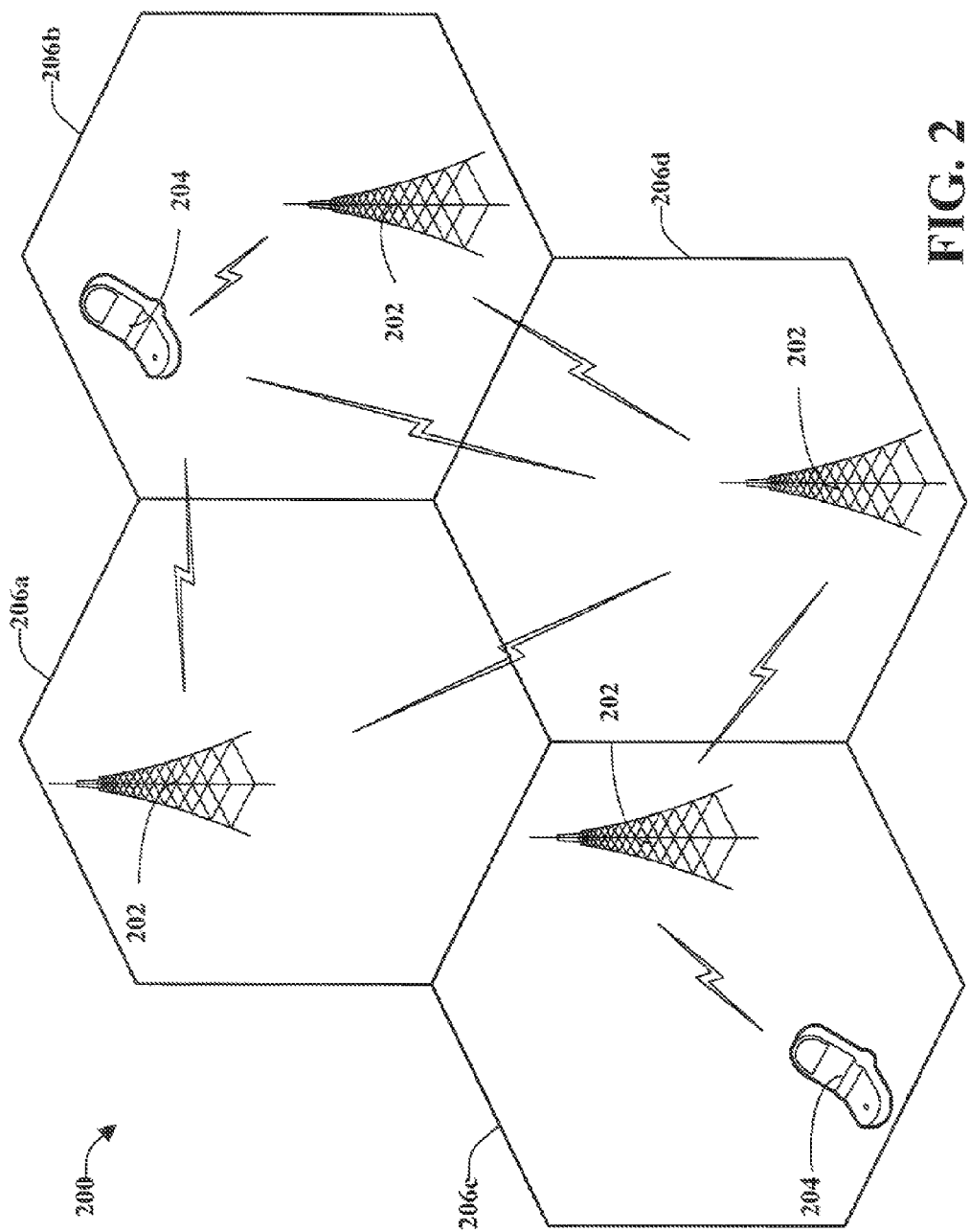
FIG. 2 is an illustration of an ad hoc or unplanned/semi-planned, wireless communication environment, in accordance with various aspects.

FIG. 2 is an illustration of an ad hoc or unplanned/semi-planned wireless communication environment 200, in accordance with various aspects. System 200 can comprise one or more base stations 202 in one or more sectors that receive, transmit, repeat, etc., wireless communication signals to each other and/or to one or more mobile devices 204. As illustrated, each base station 202 can provide communication coverage for a particular geographic area, illustrated as three geographic areas, labeled 206a, 206b, 206c and 206d. Each base station 202 can comprise a transmitter chain and a receiver chain, each of which can in turn comprise a plurality of components associated with signal transmission and reception (e.g., processors, modulators, multiplexers, demodulators, demultiplexers, antennas, and so forth.), as will be appreciated by one skilled in the art. Mobile devices 204 may be, for example, cellular phones, smart phones, laptops, handheld communication devices, handheld computing devices, satellite radios, global positioning systems, PDAs, and/or any other suitable device for communicating over wireless network 200. System 200 can be employed in conjunction with various aspects described herein in order to facilitate providing scalable resource reuse in a wireless communication environment, as set forth with regard to subsequent figures.

Figure 3:
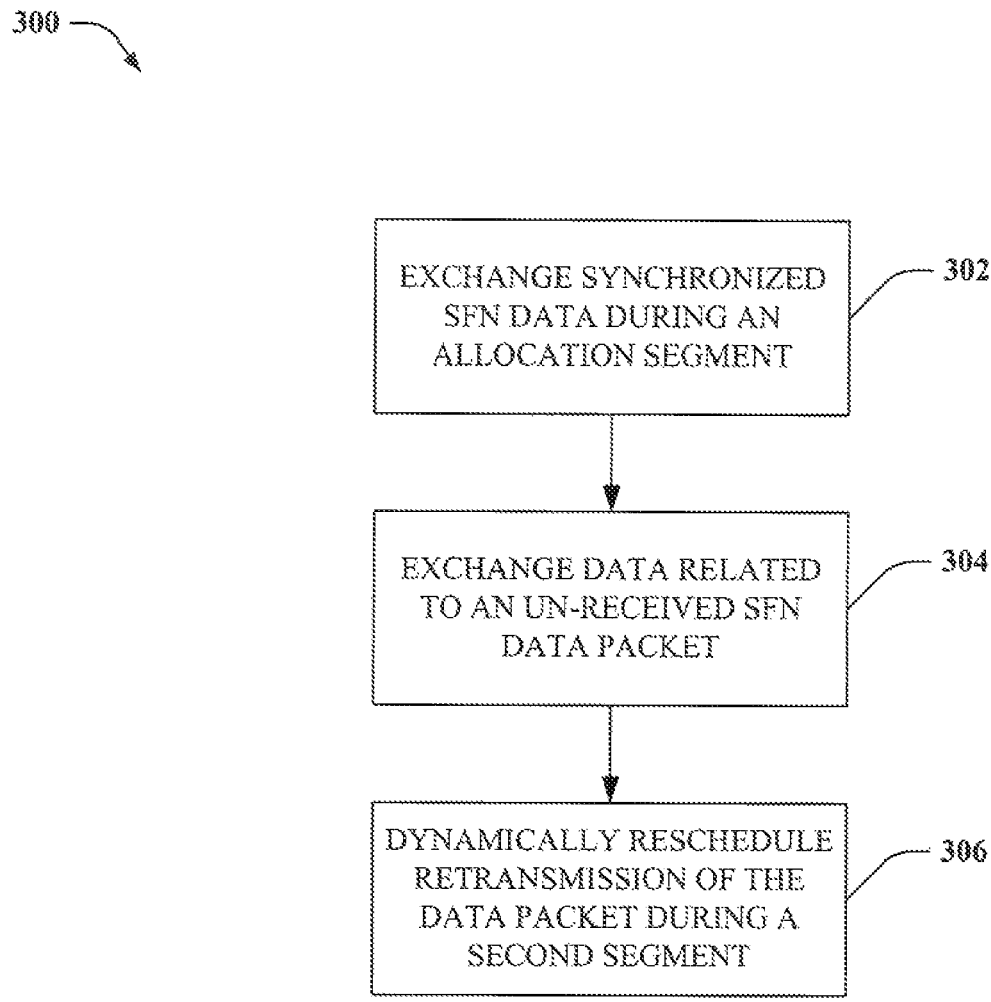
FIG. 3 is a depiction of an example methodology for providing retransmission of SFN data in accordance with one or more aspects.
Figure 4:
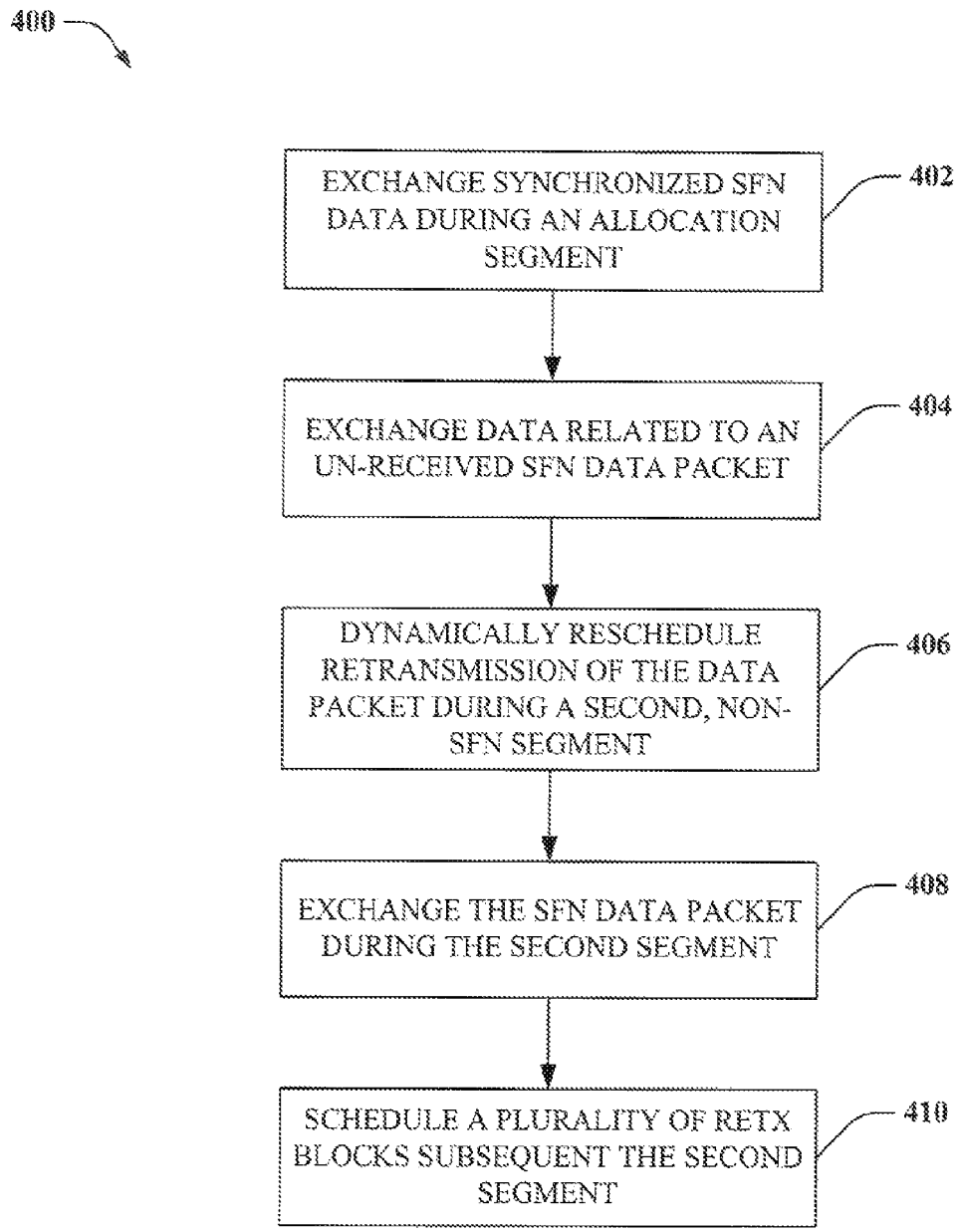
FIG. 4 is an illustration of a sample methodology for providing retransmission of SFN data in non-SFN data blocks in accordance with additional aspects.
Figure 5:
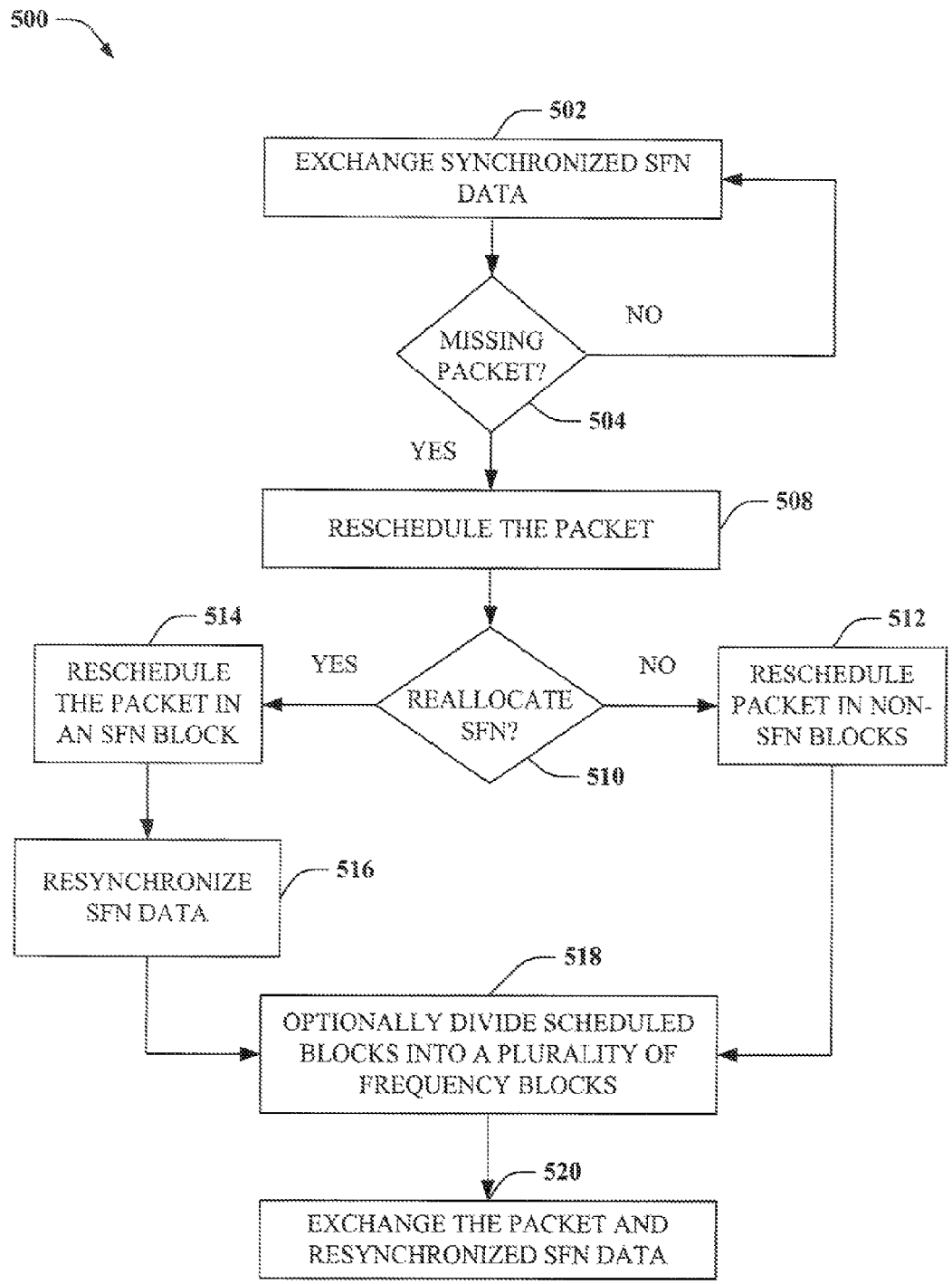
FIG. 5 depicts an example methodology for providing retransmission of SFN data without affecting synchronized SFN transmission in accord with one or more aspects.

Referring to FIGS. 3-5, methodologies relating to providing synchronized transmission and retransmission of third generation partnership project, long term evolution (3GPP LTE) multimedia broadcast multicast service (MBMS), also known as E-MBMS, data utilizing single frequency network (SFN) operation. For example, methodologies can relate to providing such synchronized transmissions in a frequency division multiple access (FDMA) environment, an orthogonal frequency division multiple access (OFDMA) environment, a code division multiple access (CDMA) environment, a wideband code division multiple access (WCDMA) environment, a time division multiple access (TDMA) environment, a space-division multiple access (SDMA) environment, or any other suitable wireless environment. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

FIG. 3 is a depiction of an example methodology 300 for providing retransmission of SFN data in accordance with one or more aspects of the subject disclosure. Method 300 can facilitate retransmission of an un-received or indecipherable SFN data packet while preserving overall synchronization of SFN data. For instance, such SFN data packet can be scheduled during a portion of an allocation period apportioned for non-SFN data. More specifically, the scheduled portion can be subdivided into multiple time or frequency blocks. Subdivided blocks can enable the SFN data packet to be transmitted contemporaneous with or immediately subsequent to a set of E-MBMS data transmissions, of which the SFN data packet is a subset. Consequently, terminal (e.g., cellular telephones, mobile devices, multi-mode devices, and so on) duty cycle can be reduced for SFN transmission and/or retransmission, that is, because transmission and retransmission are grouped according to service, a terminal can 'sleep' during E-MBMS data transmission irrelevant to the terminal.

According to method 300, at 302, synchronized SFN data can be exchanged during an allocation segment. Specifically, SFN data synchronized among a plurality of transmitters can be transmitted during a segment of a transmission allocation period. The plurality of transmitters can include, e.g., enhanced Node base stations (eNode Bs), wireless access points, or the like. In addition, at reference number 302, the synchronized SFN data can be received at one or more terminals (e.g., cellular telephones, mobile devices, multi-mode devices, etc.)

The plurality of transmitters can synchronize the SFN data by transmitting each block of SFN data at substantially equivalent times at each transmitter. Synchronization can be beneficial to reducing cell interference and maintaining high communication data rates between a transmitter and a terminal. With respect to method 300, the SFN data can include E-MBMS data associated with one or more services. Typically, data associated with a first service is scheduled within a portion of the allocation segment that is distinct from data associated with a second service. As a result, data related to different services can be transmitted at distinct times, and a terminal receiving such transmission can remain active only during scheduled segments carrying data pertinent to a service the device is using. Consequently, such distinct scheduling can reduce a duty cycle of the device (see FIGS. 11, 11A, 12, and 12A for further illustration of scheduling, infra).

Methodology 300 proceeds from 302 to reference number 304, where data related to an un-received or indecipherable SFN data packet can be exchanged. The data can include feedback from a terminal that attempted to receive transmission of data scheduled within a transmission allocation period, for instance. The feedback can indicate that one or more data packets related to an E-MBMS service, which were scheduled for transmission during a particular allocation period, were not received. Alternatively, or in addition, the feedback can indicate that a portion of one or more data packets is indecipherable to the terminal. Such feedback can also include a request to retransmit the un-received and/or indecipherable data packet(s). Additionally, such feedback can be sent from a terminal to one or more SFN transmitters, regardless of a particular transmitter from which the data is received.

At 306, retransmission of an SFN data packet can be dynamically rescheduled during a second segment of a second allocation period. The second allocation period can be subsequent to the first allocation period. In addition, a segment of an allocation period containing one or more retransmitted data packets can also be called a 'reTx' block. Moreover, the second allocation period can be subdivided into multiple time and/or frequency portions that can contain such a reTx block. For example, a first time period/block can contain data related to service A (e.g., an E-MBMS service, a multimedia broadcast service such as video, including mobile television, streaming audio, file download service, streaming text such as stock ticker services, or the like), and a second time period/block can contain data related to service B, and so on. Retransmission of an un-received SFN data packet related to service A can be in a reTx block immediately adjacent (e.g., in time) to the first time period/block, for instance. Retransmission of an un-received SFN data packet related to service B can be in a reTx block immediately adjacent to the second time period/block, and so on.

As an alternate example, a reTx block allocated to an SFN data packet associated with service A can be within a different frequency subdivision of a time period dedicated to service A. Additionally, a reTx block allocated to an SFN data packet associated with service B can be within a different frequency subdivision of a time period dedicated to service B, and so on. In such a manner as described, terminal devices receiving a transmission from a wireless network can remain active only during portions of a transmission containing services pertinent to each terminal device. By sleeping during other portions of the transmission, a duty cycle associated with such devices can be reduced for transmission and retransmission of SFN data.

FIG. 4 is an illustration of a sample methodology 400 for providing retransmission of SFN data in non-SFN data blocks in accordance with additional aspects of the claimed subject matter. According to method 400, at 402 synchronized SFN data can be exchanged during a segment of an allocation period. For example, the data can be transmitted by one or more transmitters associated with a wireless communication network, and received by one or more terminals able to establish a wireless link (and, e.g. authorized to conduct communication) with such transmitters. The exchange of synchronized data can be substantially similar to that described at FIG. 3, supra.

At 404, data related to an un-received or indecipherable data packet can be exchanged, for instance, between one or more terminal devices and one or more transmitters. The data can include feedback indicating a service (e.g., an E-MBMS service) related to the data packet, and requesting retransmission of the data packet. Such feedback can be sent to one or more transmitters of a wireless communication network, for instance, an eNode B, or the like.

At 406, an un-received or indecipherable data packet can be dynamically rescheduled during a second segment of the allocation period. More specifically, the second segment can be a portion of the allocation segment scheduled for non-synchronized, non-SFN data (or, e.g. a segment scheduled to include no data). As a result, scheduled E-MBMS services are not interrupted, and synchronized SFN transmission of the E-MBMS services to multiple cells can be preserved.

As an additional benefit, no coordination among transmitters is required for retransmission of the data packet. Specifically, non-synchronized transmissions can be performed on a cell by cell basis. Moreover, each transmitter need only transmit data packets required by terminal devices within a cell serviced by the transmitter. This is because non-synchronized communication is typically cell independent. As an example, non-synchronized retransmissions by a single eNode B are received by all terminals maintaining an active wireless link with the eNode B, but not all terminals communicating with the network. By re-allocating non-SFN portions of an allocation period to retransmitting SFN data packets, a great deal of network bandwidth and processing power can be reduced, and a duty cycle and bandwidth of terminals communicating with the network can be improved.

At reference number 408, the SFN data packet is exchanged between a transmitter and a terminal during a second allocation period. As specified above, such exchange can be cell specific, and can reduce network bandwidth and processing resources, and terminal duty cycle and data rates. At 410, a plurality of reTx blocks can be scheduled within the second allocation period on a cell by cell basis for retransmission of additional data packets required by terminals within a cell. In such a manner, method 400 can provide for retransmission of un-received or indecipherable SFN data packets while maintaining high network bandwidth, and reducing network processing power and terminal duty cycle.

FIG. 5 depicts an example methodology 500 for providing retransmission of SFN data without affecting synchronized SFN transmission in accord with one or more aspects disclosed herein. At 502, synchronized SFN data is exchanged, for instance, between terminals of a wireless communication network and one or more subscriber devices. At 504, a determination is made as to whether an SFN data packet, associated with the exchanged SFN data, is missing at a subscriber device. For instance, such determination can result from analysis of the SFN data packets received at the subscriber devices, and subsequent feedback related to such SFN data packets. As a more specific example, a subscriber device can receive data scheduled within a transmission allocation period from one or more eNode Bs. Additionally, the data schedule can be indicated within the transmission. The subscriber device can analyze the transmission schedule to determine what data packets should be sent, and whether data packets intended to be sent had been received at the subscriber device. Additionally, the subscriber device can analyze the transmission schedule on a service by service basis. More specifically, services pertinent to the subscriber device can be analyzed (e.g., including data transmission scheduling services, as well as communication services such as E-MBMS), and services not pertinent to the subscriber device can be ignored. The subscriber device can then reply to one or more eNode Bs indicating a need for retransmission of a data packet. Alternatively, or in addition, the subscriber device can reply to one or more eNode Bs indicating a need for retransmission of one or more data packets related to services pertinent to the subscriber device, and not reply in regard to data packets related to other services.

If, as a result of the determination at reference number 504, a data packet is missing or indecipherable, method 500 can proceed to reference number 508. Otherwise, method 500 returns to reference number 502, where synchronized SFN data can be exchanged again. At reference number 508, the missing data packet(s) can be rescheduled. Specifically, a scheduling component associated with a transmitter and/or a core wireless communication network can determine a manner for rescheduling such data packet. At reference number 510, a determination is made as to whether data blocks scheduled for SFN resources need to be re-allocated to the retransmission of the data packet(s). If not, method 500 proceeds to reference number 512, where the data packet(s) is rescheduled utilizing a non-SFN portion of a transmission allocation period, which can include a portion scheduled to contain no data, in a manner substantially similar to that described above at FIG. 4.

If, as a result of the determination at 510, a portion of an allocation period dedicated to SFN data must be re-allocated to the retransmitted packet, method 500 proceeds to 514. At reference number 514, the data packet is rescheduled utilizing SFN resources. At reference number 516, SFN data is re-synchronized amongst network transmitters. Specifically, SFN data displaced by the retransmitted data packet(s) are rescheduled within a portion of the transmission allocation period and/or a subsequent transmission allocation period so as to be transmitted by all network transmitters at a substantially equivalent time. In addition, the retransmitted SFN data packet is synchronized amongst all network transmitters as well in a substantially similar manner. Consequently, retransmission of un-received SFN data packets can be effectuated by method 500 even if resources scheduled for SFN transmissions must be re-allocated to the un-received SFN packets.

At 518, scheduled, time-based blocks of an allocation period are optionally divided into frequency sub-blocks. Such frequency sub-blocks can enable retransmission of an un-received or indecipherable SFN data packet contemporaneous with transmission of SFN data pertaining to a service of which the SFN data packet is a subset. Consequently, transmission and retransmission can optionally be conducted at concurrent blocks of time.

At 520, the retransmitted data packet and resynchronized SFN data, if appropriate, is exchange between transmitter and subscriber device. As a result, method 500 can facilitate retransmission of SFN data on a cell by cell basis, or on a network-wide basis if necessary, while maintaining desired synchronization of SFN transmissions.

In accordance with methodologies 300, 400, and 500 it should be appreciated that the acts performed at the various reference numbers can be performed by various systems, electronic components, processors, and the like. Specifically, a processor, apparatus, computer executing instructions contained on a computer-readable medium, or the like are all capable of executing the foregoing acts, or related acts not specifically articulated but known in the art or made known to one of skill in the art by way of the context provided herein. As a result, such mechanisms for executing the methods depicted by FIGS. 3-5 are incorporated into the subject disclosure.

Figure 6:
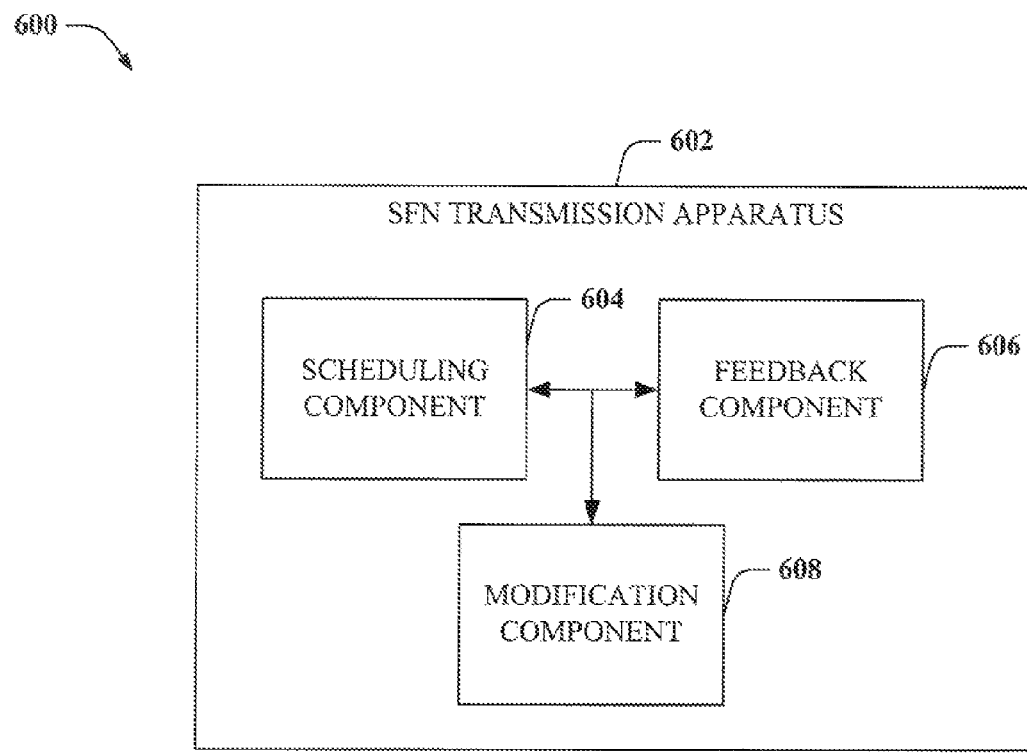
FIG. 6 illustrates an exemplary system for retransmission of SFN data in accord with related aspects of the subject disclosure.

FIG. 6 illustrates an exemplary system 600 for retransmission of SFN data in accord with related aspects of the subject disclosure. SFN transmission apparatus 602 can schedule transmission of SFN and non-SFN data, as well as empty blocks of data, and re-allocate scheduled portions to retransmission of missing data packets as required by one or more terminal devices (not shown). Specifically, scheduling component 604 can synchronize SFN data packets scheduled for transmission during a first or second allocation period among a plurality of transmitters. For example, related SFN data packets can be scheduled within a common block of a transmission allocation period. An electronic copy of such transmission allocation period can be provided to each transmitter (e.g., eNode B, access point, or like device) effectuating communication services related to the SFN data packets. Additionally, such transmitters can initiate transmission of the allocation period at a predetermined time, established by scheduling component 604. As a result of this particular example, SFN data packets within a common block of the transmission allocation period can be synchronized by the network.

Feedback component 606 can receive feedback data related to an un-received SFN data packet. Such feedback can be provided, for instance, by one or more terminal devices that received the data transmission provided by a wireless network. Moreover, the feedback can indicate a specific service, such as a particular E-MBMS service, associated with the un-received SFN data packet. It should be appreciated that feedback component 606 can be incorporated as part of a network component, such as a transmitter or transmission controller (e.g., such as scheduling component 604 or modification component 608), part of a terminal device, such as a processor, apparatus thread of execution, or the like contained within such device, part of interactions between such network component and terminal device, or an entity separate from the network and terminal device, or combinations thereof.

Modification component 608 can schedule retransmission of an un-received SFN data packet during a second allocation period. Furthermore, the retransmission can be scheduled in a manner that does not affect synchronization of SFN data packets scheduled for transmission during the second allocation period. For example, transmission blocks originally scheduled for non-SFN data can be re-allocated by modification component 608 to retransmission of the un-received SFN data packet. As a result of this example re-allocation, un-received data packets can be retransmitted on a cell by cell basis, requiring no synchronization among transmitters. Consequently, network bandwidth and processing resources can be preserved. Moreover, duty cycle and bandwidth of terminal devices can also be preserved.

In accordance with another example, modification component 608 can re-allocate (e.g., dynamically or otherwise) blocks of the second transmission allocation period scheduled for SFN transmission to retransmission of the SFN data packet, if suitable. As a result, retransmission could occur more quickly than by other mechanisms, as an SFN data packet could be dynamically rescheduled during SFN transmission, and need not wait for non-SFN transmissions to commence. As a result of such re-allocation, scheduling component 604 could re-synchronize SFN transmissions scheduled for the second transmission allocation period, including the retransmitted SFN data packet. In such a manner, synchronization of SFN data can be preserved by system 600 along with retransmission of un-received SFN data packet.

Figure 7:
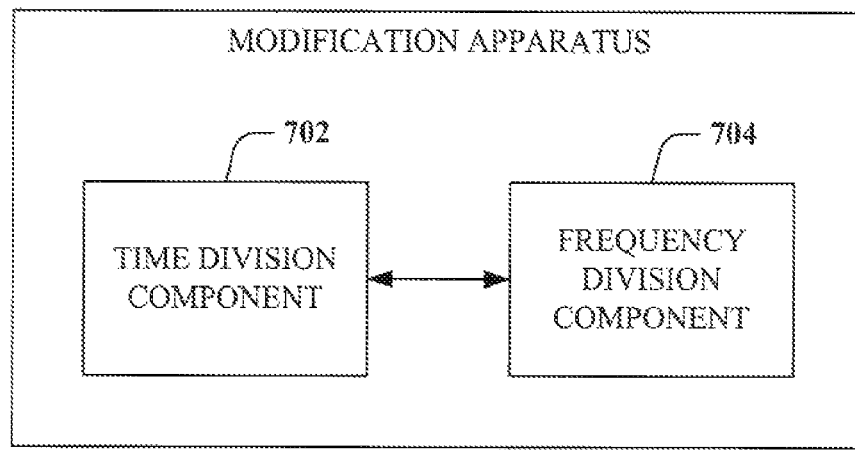
FIG. 7 illustrates an exemplary modification apparatus that can schedule retransmitted data without affecting synchronization of SFN data in accord with additional aspects.

FIG. 7 illustrates an exemplary modification apparatus 700 that can schedule retransmitted data without affecting synchronization of SFN data in accord with additional aspects. Modification apparatus 700 can schedule retransmission of an un-received SFN data packet. Specifically, such scheduling can time and/or frequency multiplexed with SFN blocks during a transmission allocation period. Furthermore, the retransmission can be scheduled in a manner that preserves synchronization of SFN data transmitted during the transmission allocation period.

Figure 11:
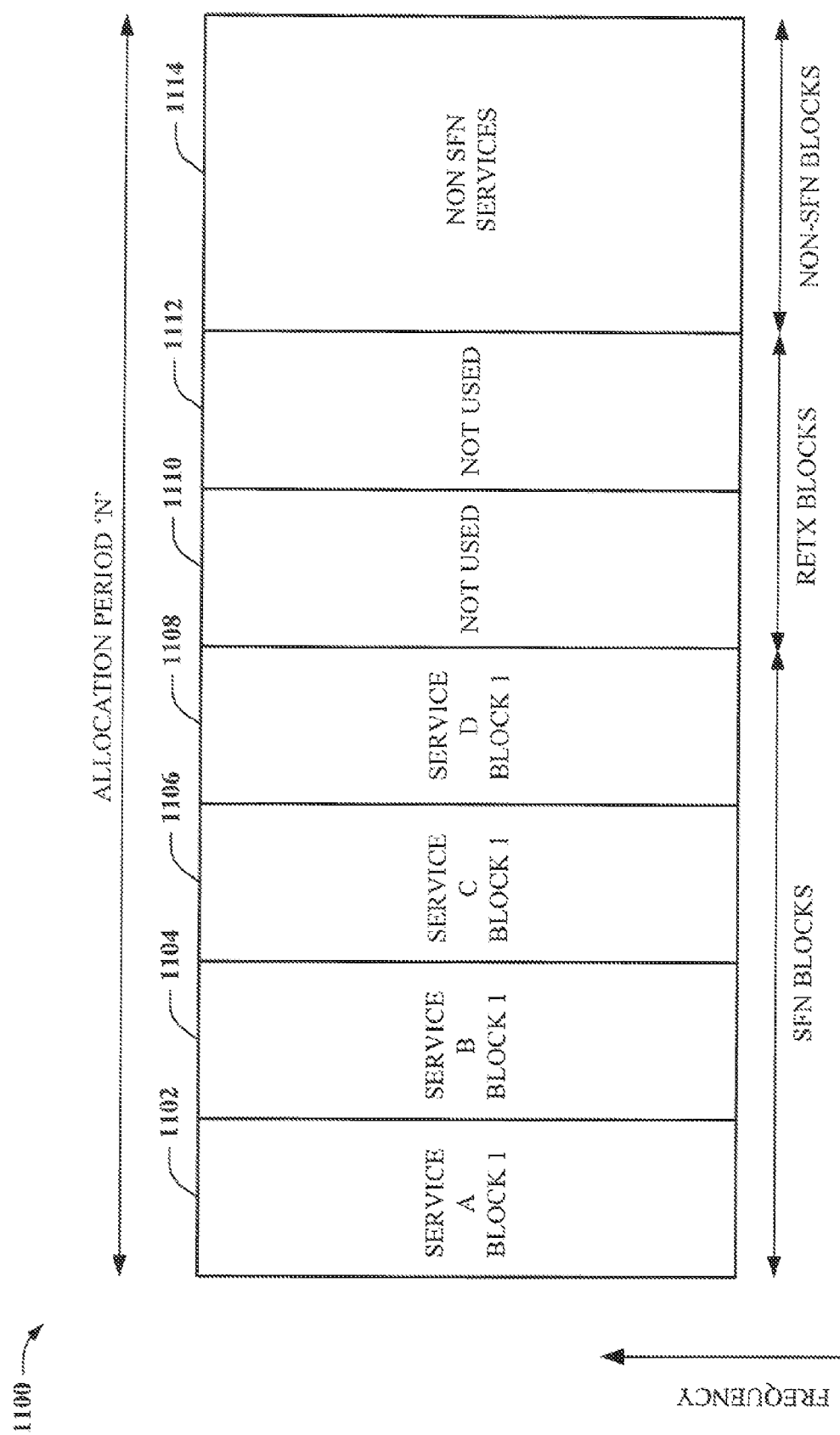
FIGS. 11 and 11A depict a pair of example transmission allocation periods facilitating allocation of retransmitted SFN data in accordance with the subject disclosure.
Figure 11A:
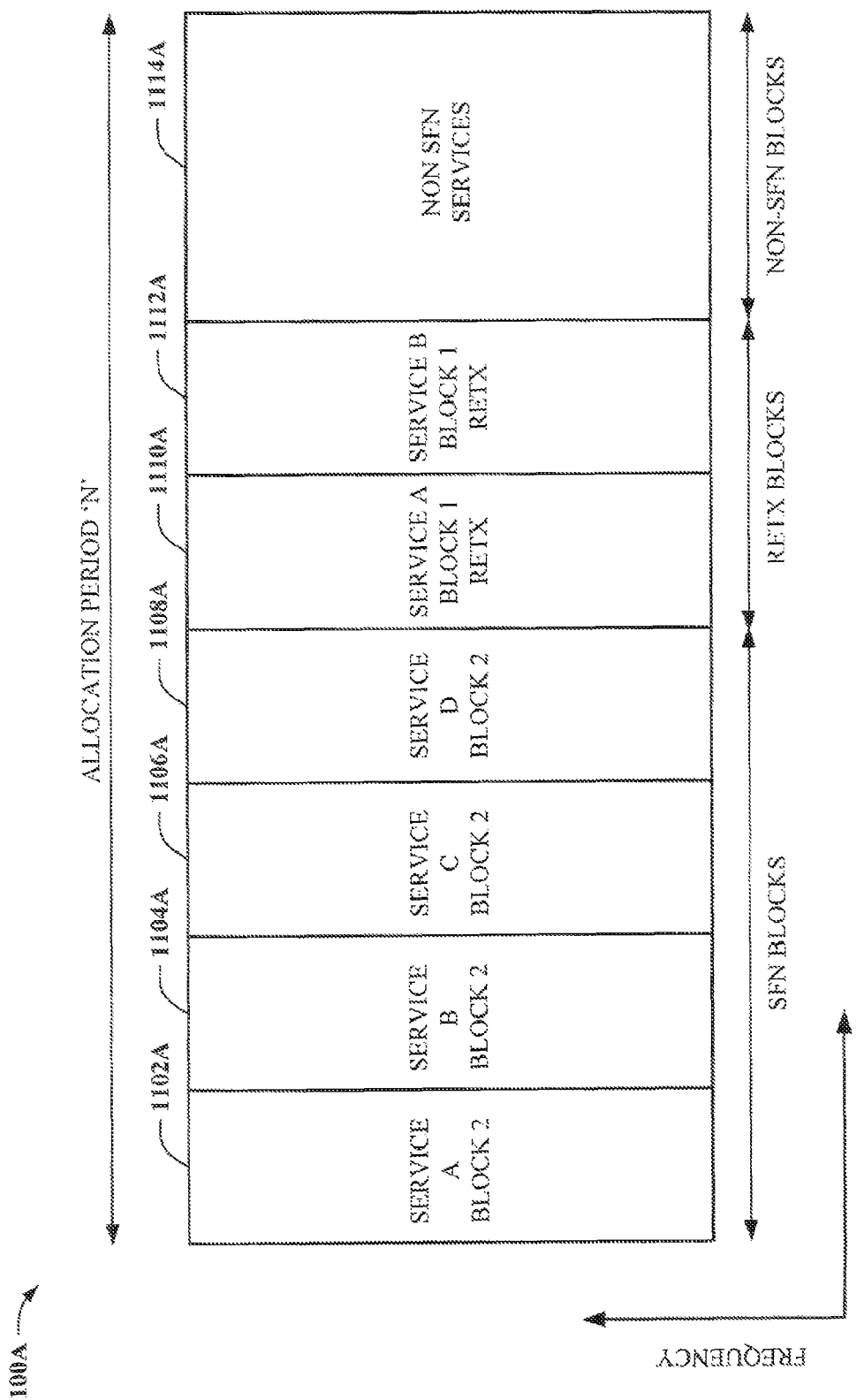

Time division component 702 can divide one or more transmission allocation periods into time based sub-periods (e.g., block of transmission time, see FIGS. 11 and 11A, infra). In addition, each sub-period can be scheduled to either a distinct block of data, including, e.g., SFN data or non-SFN data, or can be scheduled to a block containing no data (e.g., by scheduling component 602, discussed at FIG. 2, supra). Such sub-periods can also be re-allocated by modification apparatus 700 to retransmission of an un-received or indecipherable SFN data packet, as described herein.

Typically, time multiplexing can extend the duty cycle of a terminal device that receives a transmission. Particularly, in addition to receiving time based sub-periods scheduled for SFN transmission related to a chosen service, the device must stay awake for retransmission sub-periods. To mitigate this problem, modification apparatus 700 can re-allocate an SFN data packet to a time based sub-period immediately prior to or subsequent to related SFN data (or, e.g., substantially near to the related SFN data, whether prior or subsequent, if suitable). Specifically, SFN data pertaining to a particular E-MBMS service, of which the SFN data packet is a subset, can be scheduled adjacent to the retransmitted data packet. As a result, SFN data pertaining to particular services can be transmitted in an uninterrupted fashion. In addition, scheduling information can be transmitted at the beginning of an allocation period, to indicate in advance what data will be transmitted and in what order. Consequently terminal devices can reduce their duty cycle by 'sleeping' during transmission of irrelevant services. For example, a terminal device that receives an entire service transmission during a particular allocation period can ignore all blocks re-allocated to retransmission of data from that allocation period. Additionally, such device can ignore all sub-periods scheduled for transmission of irrelevant services. As a result, devices can preserve a substantial amount of power by going inactive during such transmission periods.

Figure 12:
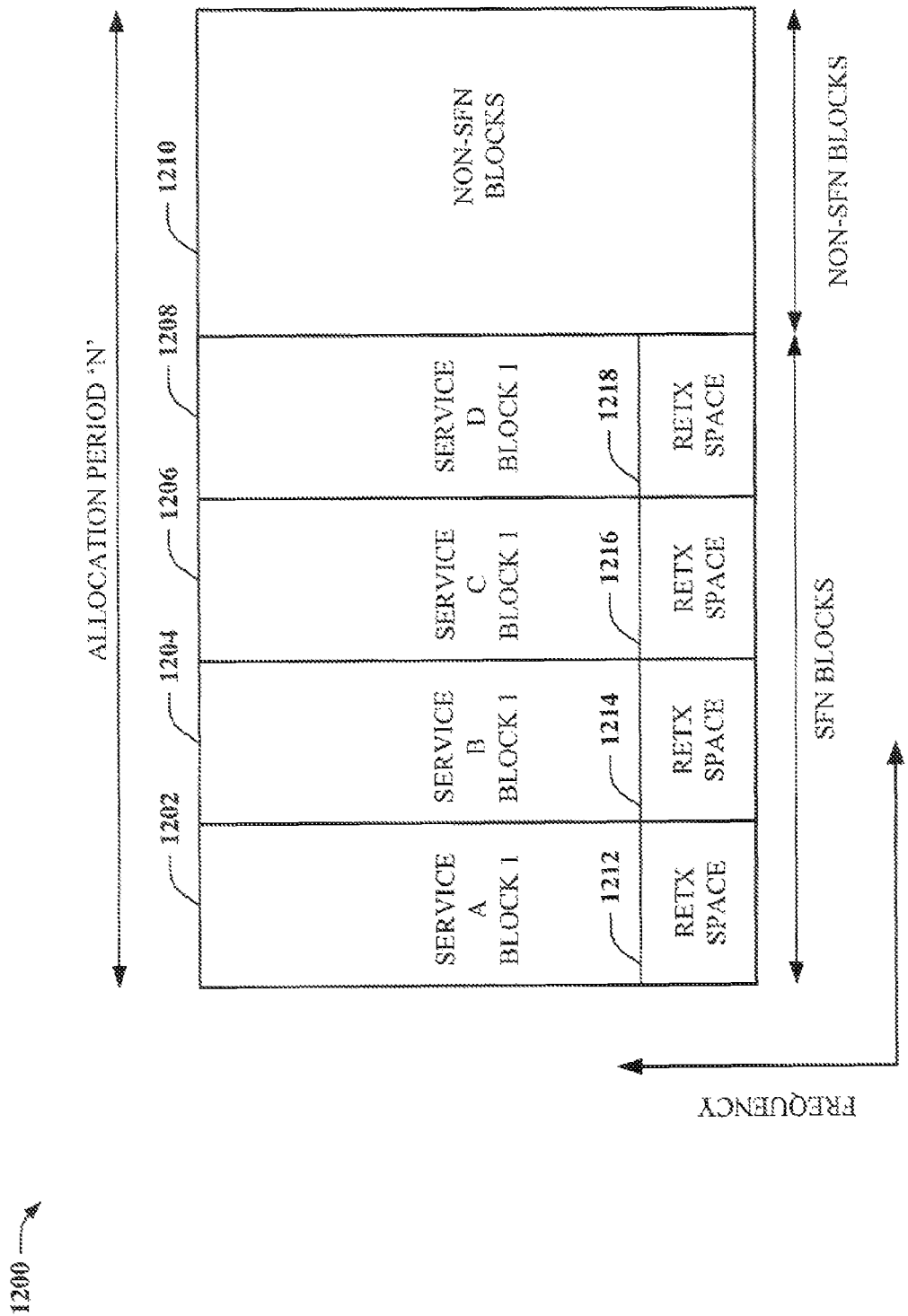
FIGS. 12 and 12A depict a pair of frequency divided allocation periods, wherein SFN retransmission can occur in one or more frequency subdivisions in accordance with one or more aspects described herein.
Figure 12A:
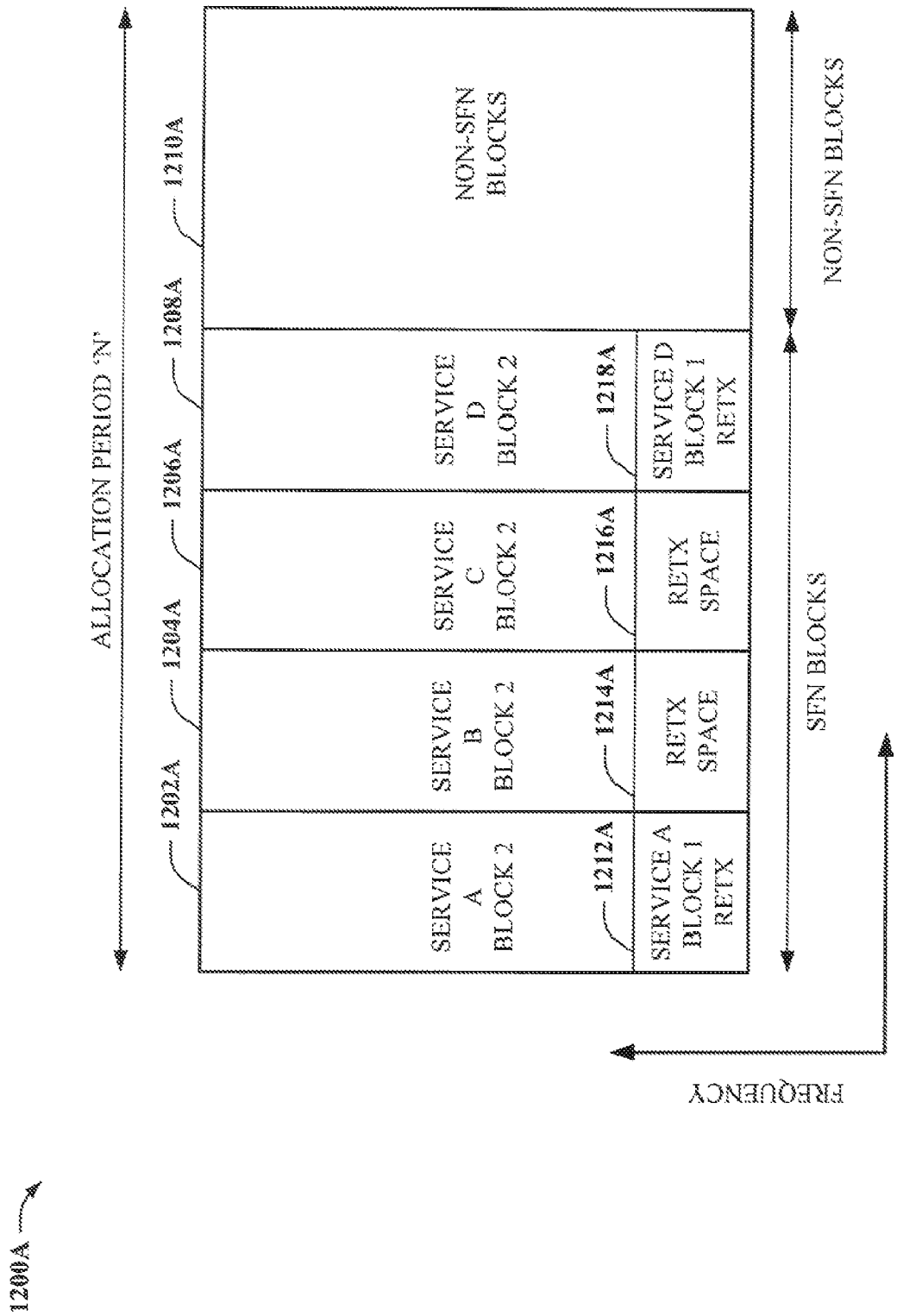

Frequency division component 704 can subdivide a transmission frequency of at least a portion of one or more transmission allocation periods into a plurality of frequency subdivisions, such that at least one subdivision can transmit an un-received SFN data packet (see FIGS. 12 and 12A, infra). As a result data associated with particular SFN and/or E-MBMS services can be transmitted or retransmitted in a concurrent time period. For example, assume a first portion of a transmission allocation period contains SFN data related to service A. Assume also that an SFN data packet related to service A needs to be retransmitted. Frequency division component 704 can subdivide the first portion of the transmission allocation period into at least two frequency subdivisions. A first subdivision of the first portion can be re-allocated to the SFN data related to service A, originally scheduled for transmission during the first portion. A second subdivision of the first portion can be re-allocated to retransmission of the SFN data packet related to service A. Such transmission and retransmission can occur substantially simultaneously. Said differently, the allocation of retransmission blocks for a given service is essentially static, changing only when a change in the arrangement of SFN blocks is negotiated among an entire group of SFN transmitters. In the case where a single transmitter does not need to retransmit a particular SFN data packet, the transmitter can optionally reclaim the frequency subdivision for other non-MBMS services.

Frequency subdivision can provide a substantial benefit for terminal devices. Specifically, an increased duty cycle that results from needing data retransmitted can be mitigated. Assume, for instance, a terminal device does not receive a first data block for Service A included within a first allocation period. As a result, the terminal device might typically have to be 'awake' for an additional portion of a subsequent allocation period to receive retransmission of the first data block (e.g. an allocation period containing a second data block for service A as well as a portion containing the retransmitted first data block could potentially double the device's duty cycle). Data provided by system 700, however, can employ a single time period to transmit a subsequent data block for Service A as well as the missed data block. In such a manner, an increase in duty cycle can be mitigated by system 700 for retransmission of data.

Figure 8:
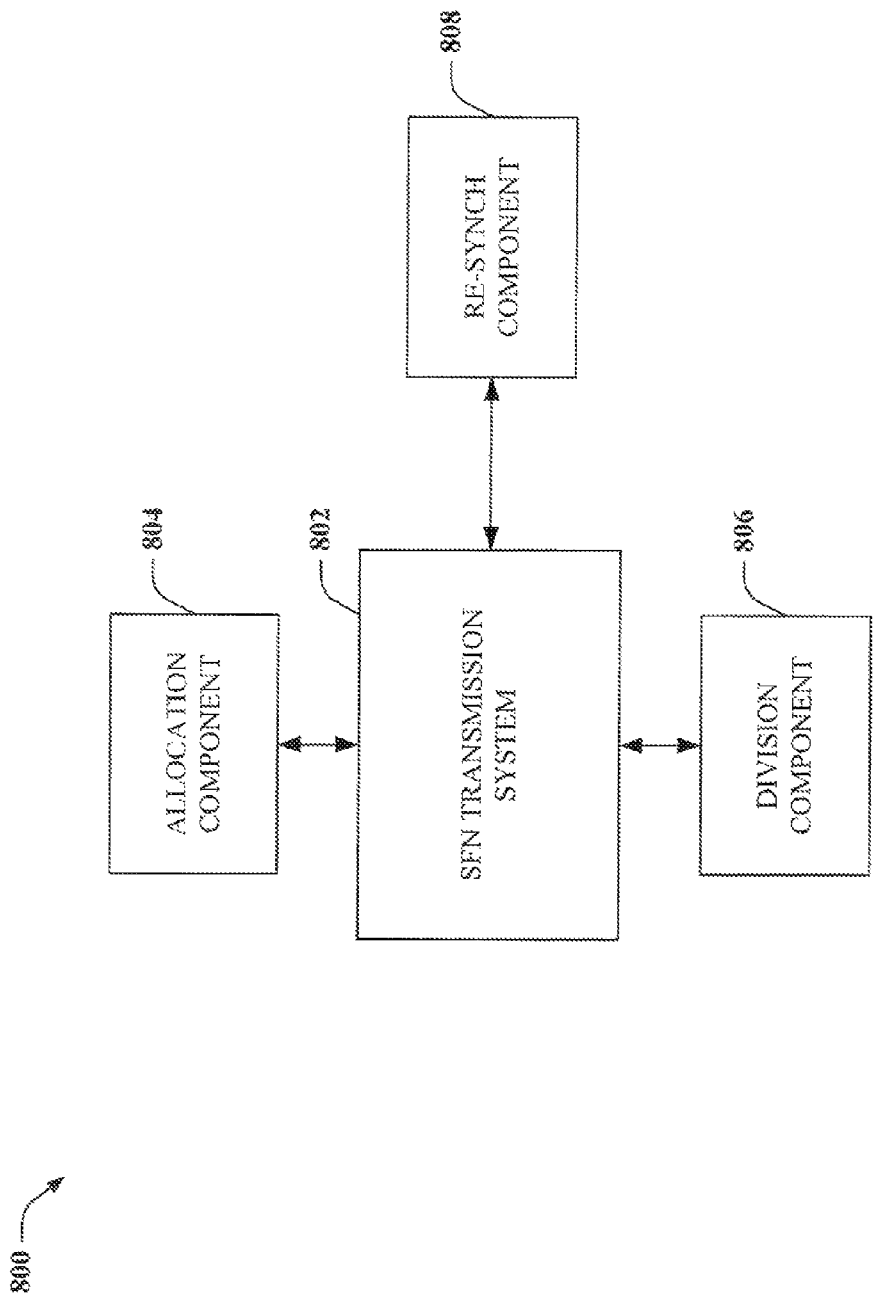
FIG. 8 depicts an example system for resynchronizing SFN data in conjunction with retransmission of an SFN data packet(s) in accordance with related aspects.

FIG. 8 depicts an example system 800 that can resynchronize SFN data in conjunction with retransmission of an SFN data packet(s) in accordance with related aspects. SFN transmission system 802 schedule transmission of various blocks of data, or empty blocks containing no data, within one or more transmission allocation periods as described herein. Furthermore, SFN transmission system 802 can transmit the allocation period and data contained therein to one or more network cells (e.g., via one or more eNode Bs, one or more radio frequency access points, or the like). SFN transmission system 802 can also receive information related to un-received or indecipherable data packets and retransmit such data packets.

System 800 can also subdivide a scheduled allocation period, re-allocate subdivided portions to retransmission of SFN data, and re-synchronize SFN transmissions as required. Specifically, division component 806 can subdivide portions of a transmission allocation period so as to include retransmission data within the allocation period. In addition, the subdivision can occur dynamically, while portions of the allocation period are being transmitted, or statically, prior to such transmission. Furthermore, such subdivisions can be time based or frequency based, as discussed at FIG. 7, supra (see also FIGS. 11 through 12A).

Allocation component 804 can re-allocate portions of a transmission allocation period, either dynamically or statically. For instance, non-SFN portions can be allocated to retransmission of data that were originally transmitted in an SFN data packet. The non-SFN portion can also be re-allocated, either to a scheduled empty block, to an empty subdivision created by division component 806, to a subsequent allocation period, or to any suitable portion of the transmission allocation period. It should be appreciated that allocation component 804 can also re-allocate transmission and retransmission data associated with a service to contiguous subdivisions, blocks, portions, or the like, of the transmission allocation period. Furthermore, allocation component 804 can include or modify a transmission schedule included within an allocation period, which indicates the order of transmission of blocks of data. As a result, terminal devices can go inactive during transmission periods that are irrelevant to services the device has chosen.

It should also be appreciated that allocation component 804 can re-allocate portions of the allocation period scheduled for SFN transmission. As a result, re-synch component 808 can ensure that SFN transmission and retransmission included within an allocation period is resynchronized, to preserve the high data rates and reduce network interference. Specifically, re-synch component 808 can dynamically re-organize scheduling of SFN data within an allocation period, not already transmitted, into common blocks or subdivisions. As an example, if data associated with an E-MBMS service A is displaced by allocation component 804 for retransmission of an SFN data packet related to service B, re-synch component 808 can re-organize the data into a block of the allocation period. Furthermore, re-synch component 808 can send the re-organized allocation period to all transmission devices in the wireless network to ensure that the transmitted SFN data remains synchronized. Re-synch component 808 can also re-organize retransmitted SFN data packets allocated by the allocation component 804, as necessary, to assure synchronized retransmission of such data packets. In such a manner as described, system 800 can provide for synchronized SFN transmission in conjunction with dynamic or static re-allocation of SFN data in accord with one or more aspects disclosed herein.

Figure 9:
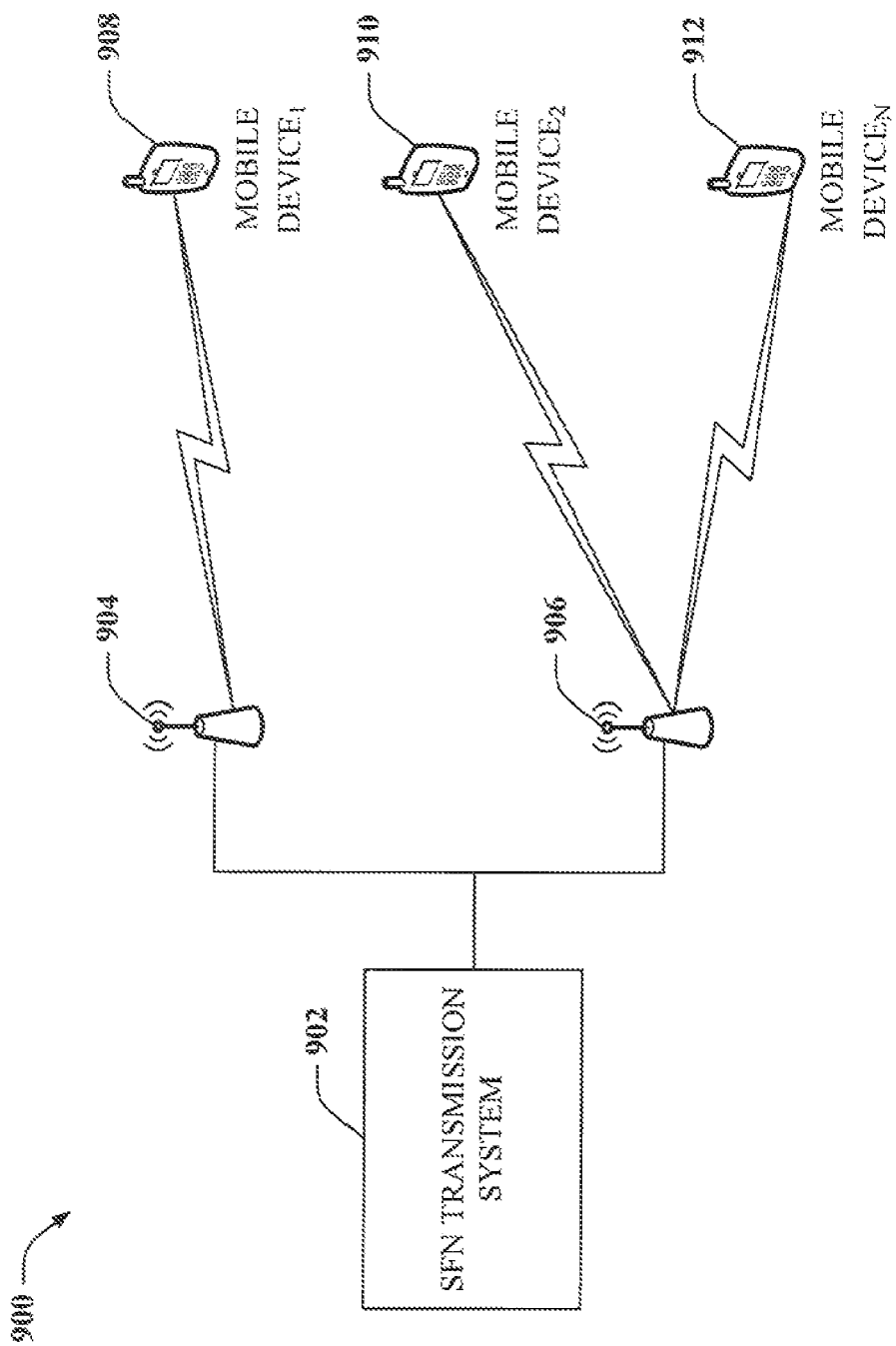
FIG. 9 illustrates a communication apparatus that provides synchronized retransmission of SFN data according to one or more aspects of the claimed subject matter.

FIG. 9 illustrates a communication apparatus that provides synchronized retransmission of SFN data according to one or more aspects of the claimed subject matter. SFN transmission system 902 can schedule SFN and non-SFN data for transmission, as well as statically or dynamically re-schedule such data to accommodate retransmission of lost data packets, as described herein. SFN transmission system 902 can also include a data block schedule within a transmission allocation period, to indicate an order of transmission of blocks of data. For example, such schedule can indicate that an allocation period will first transmit data associated with E-MBMS service A, followed by E-MBMS service B, each for a particular block of time. Additionally, the schedule can indicate that non-SFN services are scheduled, for instance after E-MBMS service B. Consequently, mobile devices (908, 910, 912) receiving such transmission can partially power down during transmission of irrelevant data, to preserve power.

As a more specific example, assume mobile device, 908 is connected to a wireless network, including SFN transmission system 902 for instance, by an eNode B 904, and receives data associated with E-MBMS service A there from. Absent a schedule indicating when services related to E-MBMS service A are scheduled, mobile device$_1$ 908 would have to analyze all incoming data to determine what data is pertinent and what data is not. Consequently, such device (908) would need to be fully powered on for the duration of the transmission. If, on the other hand, a transmission schedule is provided with the transmission, mobile device$_1$ 908 can 'sleep' during periods scheduled for E-MBMS service B and non-SFN services, thereby conserving power.

As an additional example, assume that SFN transmission system 902 includes retransmitted data packets as part of a transmission. Such data packets can be scheduled immediately prior or immediately after (or concurrently with, in the case of frequency subdivision as discussed herein) related SFN transmissions. In particular, if a data packet related to E-MBMS service A needs to be retransmitted, it can be retransmitted in a subsequent allocation period contiguous to (or concurrent with) E-MBMS service A data. A transmission schedule included within the allocation period (e.g. at the beginning of such period) can indicate the schedule of transmission, enabling a device (908, 910, 912) to sleep during periods not associated with scheduling or with service A transmissions. Additionally, the foregoing can be extrapolated to multiple devices 908, 910, 912 connected to SFN transmission system 902 via multiple transmitters 904, 906. Each device (908, 910, 912) can determine a time of transmission associated with relevant data. Such device (908, 910, 912) can receive the pertinent data, and ignore the non-pertinent data, reducing overall power consumed by such device.

Figure 10:
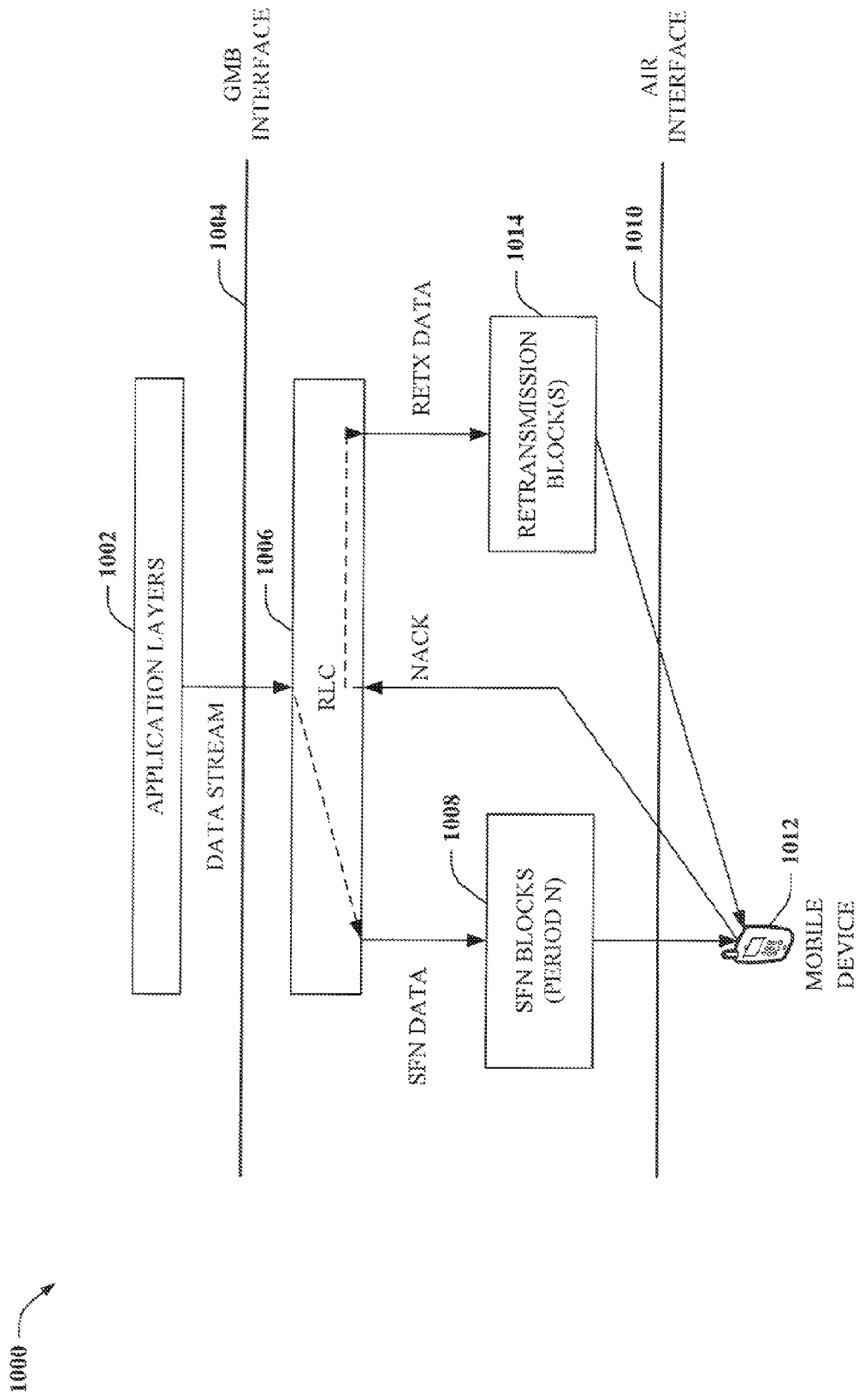
FIG. 10 illustrates an example system describing transmission and retransmission of SFN data in accordance with aspects of the subject disclosure.

FIG. 10 illustrates an example system 1000 describing transmission and retransmission of SFN data in accordance with aspects of the subject disclosure. Application layer(s) 1002 can generate data related to transmission services pertinent to one or more mobile terminals (1012). Such data can be transferred via a Gmb interface 1004 (e.g., providing MBMS functions on a control plane), to a radio link control (RLC) sub layer 1006 of a data link layer of a communication device. The RLC can transmit one or more SFN data blocks 1008 (e.g., within an allocation period of duration N) via a wireless transmitter (not shown) over an air interface 1010. Such data blocks 1008 can be received at a mobile device 1012. Such device can analyze the SFN blocks to determine whether any data packets scheduled as part of the SFN data blocks were missing or indecipherable, for instance. Subsequently, mobile device 1012 can send a negative acknowledgement (NACK), indicating any missing data packets. The NACK can be received by RLC 1006 across the air interface 1010. Subsequently, retransmission (reTx) blocks 1014 can be sent to mobile device. Such reTx blocks 1014 can be sent as part of a distinct transmission or can be incorporated into a subsequent transmission including additional data provided by application layer 1002.

Implicit in FIG. 10, is that several intervening allocation periods can be required to retransmit a missed or indecipherable data packet to a device. For instance, a time required for RLC to retransmit missed data can include the time to transmit the SFN blocks 1008 across the air interface 1010 to mobile device 1012, plus the time to receive the NACK signal at RLC 1006 across the air interface 1010 (including, e.g. the time required for mobile device 1012 to process the SFN data), and plus the time to reschedule the reTx blocks 1014. Additionally, a time required for mobile device 1012 to receive retransmitted data can include the time to transmit the NACK signal to RLC 1006, plus the time for the RLC 1006 to reschedule the reTx blocks 1014, plus the time for mobile device 1012 to receive the reTx blocks across the air interface 1010. By allowing sufficient time for these events, however, a transmission system can properly reschedule reTx blocks in subsequent allocation periods or portions of allocation periods in a manner most efficient for cell-specific transmission (e.g., in accord with re-allocation of retransmitted data to non-SFN or empty data blocks on a cell by cell basis, as described supra).

FIGS. 11 and 11A depict a pair of example transmission allocation periods, including a first transmission allocation period 1100, and a subsequent (e.g., a second, third, etc.) transmission allocation period 1100A that facilitate allocation of retransmitted SFN data in accordance with the subject disclosure. Specifically, FIG. 11 depicts a first transmission allocation period 1100 containing seven time based portions, 1102 through 1114. Four such portions 1102, 1104, 1106, and 1108 are scheduled for SFN data blocks for service A, service B, service C, and service D, respectively. The next two portions 1110 and 1112 are allocated to retransmission (reTx) blocks as described herein. It should be appreciated that, as depicted in this example, the reTx blocks are unused since there is no data that needs to be retransmitted; instead, the network could turn off its transmitter for these blocks, or reallocate the blocks to other data, such as unicast service data, or to transmissions that reinforce SFN data transmission in neighboring cells, for instance. Additionally, a last portion 1114 is scheduled for non-SFN services. The entire allocation period 1100 has duration N.

With reference now to FIG. 11A, a subsequent allocation period 1100A, transmitted and/or executed subsequent to the first allocation period 1100, is depicted that is suitable for retransmission of un-received or indecipherable data packets. As depicted, allocation period 1100A contains seven time based portions, 1102A through 1114A. The first four portions 1102A, 1104A, 1106A, and 1108A are allocated to SFN services, service A, service B, service C, and service D, respectively, as in allocation period 1100. In addition, retransmission of data associated with services A and B are scheduled at blocks 1110A and 1112A, respectively. As depicted, however, additional portions of allocation period 1100A might not be available if more retransmission, associated with services C or D for instance, is required. An exception can be if portions of subsequent allocation period 1100A scheduled for non-SFN services (e.g., portion 1114A) can be re-allocated to retransmission of such data.

As described herein, a subdivision apparatus, component, process, processor, or the like, can subdivide the reTx blocks if appropriate, or the portion 1114A scheduled for non-SFN services for additional reTx blocks. Such retransmission would not disturb synchronization of SFN data. Also as described herein, portions 1102A, 1104A, 1106A, or 1108A can be re-allocated to reTx blocks as well, but in such case re-synchronization of SFN data would be required.

Figure 13:
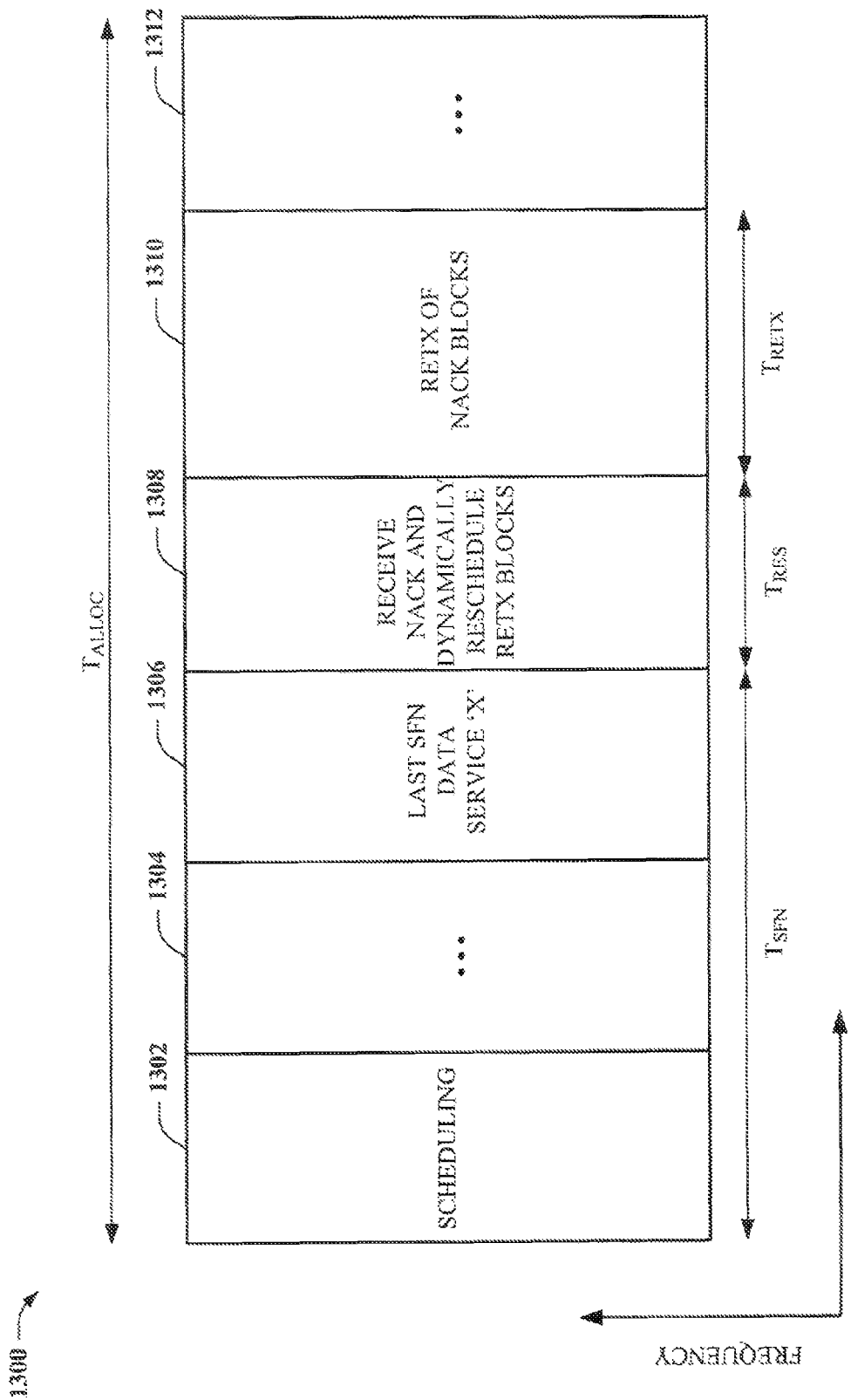
FIG. 13 illustrates an example transmission allocation period facilitating retransmission of SFN data within a single allocation period in accord with particular aspects.

It should be appreciated that an example of retransmission of data related to services A and B is depicted by FIG. 11A. For example, retransmission of an un-received or indecipherable SFN data packet(s) can occur as part of an allocation period 1100A that is subsequent a first allocation period 1100, that originally transmitted the un-received or indecipherable SFN data packet (e.g. as opposed to retransmission within a single allocation period as depicted in FIG. 13, infra). Moreover, retransmission can require a time of at least k, where k can include a time ($T_{NACK}$) required to receive a request for retransmission related to an SFN data packet (e.g. that is measured from a time of initial execution of the first allocation period 1100 that originally transmits the data packet), plus a time ($T_{SCH}$) to reschedule the SFN data packet within subsequent allocation period 1100A. Consequently, total time for retransmission $T_{RETX}$ utilizing a first allocation period 1100 and a subsequent allocation period 1100A, as described above, can be greater than or equal to k, where $k=T_{NACK}+T_{SCH}$.

FIGS. 12 and 12A depict a pair of frequency divided allocation periods, first frequency divided allocation period 1200 and subsequent (e.g. second or third, etc.) frequency divided allocation period 1200A, wherein SFN retransmission can occur in one or more frequency subdivisions in accordance with one or more aspects described herein. Specifically, FIG. 12 depicts a first transmission allocation period 1200 containing 5 time based portions 1202, 1204, 1206, 1208, 1210, of which the first four (1202, 1204, 1206, 1208) are also frequency divided. Such frequency division can create additional blocks 1212, 1214, 1216, 1218, concurrent with SFN blocks, for additional data, such as reTx data. Time based portions 1202, 1204, 1206, and 1208 can be allocated to data associated with SFN service A, service B, service C, and service D, respectively. The non-frequency subdivided portion 1210 can be allocated to non-SFN data.

With reference now to FIG. 12A, a subsequent allocation period 1200A is depicted that is suitable for retransmission of un-received or indecipherable data packets. In addition, frequency subdivision as depicted by first and subsequent frequency divided allocation periods 1200 and 1200A provides for sufficient space to transmit data packets related to each SFN service. Specifically, a frequency subdivision 1212A, 1214A, 1216A, 1218A associated with each portion 1202A, 1204A, 1206A, 1208A allocated to SFN data is available. If necessary, additional portions can be re-allocated to other SFN services from non-SFN blocks 1210A to preserve synchronization of SFN transmissions. Additionally, as described herein, if subdivisions scheduled for SFN transmission are re-allocated, additional synchronization can required before transmission of the SFN data.

It should be appreciated that, similar to the first allocation period 1100 and subsequent allocation period 1100A, depicted above at FIG. 11, a minimum time required to reschedule an SFN data packet utilizing allocation periods 1200 and 1200A can be a time k. More specifically, a time $T_{NACK}$ can represent a minimum time required to receive a NACK request from a terminal device (not shown), measured from a time of initial transmission/execution of a first frequency divided allocation period 1200. Additionally, a time $T_{SCH}$ can represent a time required to dynamically re-schedule the NACK-requested SFN data packet within subsequent frequency divided allocation period 1200A. Thus, a minimum time to reschedule a data packet utilizing the example allocation periods 1200 and 1200A, for instance, can be $T_{NACK}+T_{SCH}$.

FIG. 13 illustrates an example transmission allocation period facilitating retransmission of SFN data within a single allocation period in accord with particular aspects. Allocation period 1300 includes at least six time based portions 1302 through 1312. Additionally, allocation period 1300 has duration of $T_{ALLOC}$. The first time based portion 1302 involves scheduling data within the allocation period, and such scheduling requires a finite time. The second time based portion 1304 indicates the start of transmission of SFN content (scheduled at portions 1304 and 1306) which is concluded following transmission of data within time based portion 1306, specifically the last SFN data service 'X'. The time interval $T_{SFN}$ indicates an amount of time required to transmit all SFN data, including the time to schedule allocation period 1300.

Additional portions 1308, 1310, and 1312 are also scheduled at 1302 (although what specific information is included within such scheduled portions can be allocated dynamically). Specifically, a minimum amount of time required for a protocol layer that performs retransmissions can scheduled at time based portion 1308. More specifically, the protocol layer (e.g., an RLC layer, as indicated at 1006 of FIG. 10) can receive negative acknowledgement (NACK) feedback related to one or more un-received or indecipherable data packets, and dynamically schedule re-transmission of such packets. The time to receive and reschedule reTx blocks can be termed a response time, and represented by $T_{RES}$. ReTx blocks, allocated for carrying out retransmission of the un-received and/or indecipherable data packet(s), can be scheduled subsequently at time based portion 1310. Transmission of all reTx blocks can be represented by a time $T_{TX}$. An additional time based portion 1312 can be scheduled for non-SFN transmissions or for no data transmission (e.g. as a buffer if extra reTx blocks need dynamic scheduling or the like).

Utilizing the above defined time periods, a single allocation period requires a duration ($T_{ALLOC}$) greater than or equal to $T_{SFN}+T_{RES}+T_{TX}$ to facilitate transmission and retransmission of a data packet within the single allocation period. Such duration can be extended to allow for an additional time based period(s) 1312 (e.g., for transmission of non-SFN data or transmission of no data, enabling a buffer for extra reTx blocks). Additionally, a minimum time required to reschedule an un-received/indecipherable data packet within allocation period 1300 can be greater than or equal to a time required to transmit all SFN data $T_{SFN}$+ an amount of time required to at least receive a NACK for the data packet and reschedule the data packet $T_{RES}$. Furthermore, an amount of time required for a terminal device, as described herein, to receive a retransmitted block of data can include a receive time ($T_{REC}$) for a protocol layer device (e.g., RLC device) of a wireless communication network to receive a NACK request sent by the terminal device (measured, e.g. from a time such NACK was transmitted by the terminal device), plus a time for the protocol device to reschedule the SFN data packet $T_{SCH}$, plus a transmission time ($T_{TRAN}$) for the terminal device to receive the rescheduled data packet. Said differently, a minimum time for a terminal device to receive a retransmitted packet after initiating a NACK request for such packet can be greater than or equal to $T_{REC}+T_{SCH}+T_{TRAN}$.

Figure 14:
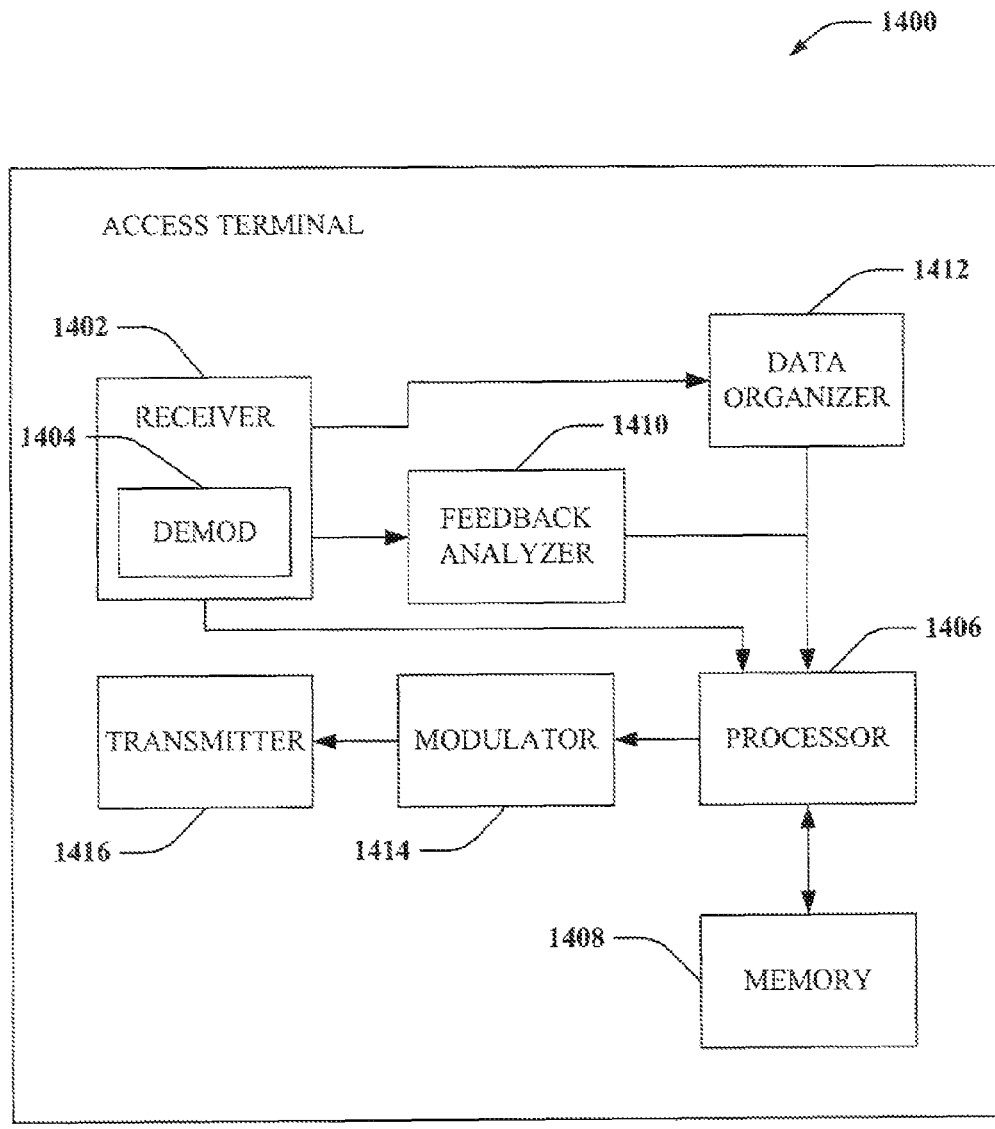
FIG. 14 depicts an access terminal that facilitates providing synchronized retransmission of SFN data in accordance with one or more aspects.

FIG. 14 is an illustration of an access terminal 1400 that facilitates providing synchronized transmission and retransmission of SFN data, in accordance with one or more aspects. Access terminal 1400 comprises a receiver 1402 that receives a signal from, for instance, a receive antenna (not shown), and performs typical actions on (e.g., filters, amplifies, downconverts, etc.) the received signal. Specifically, receiver 1402 can also receive SFN data contained within an allocation period as described herein. Receiver 1402 can comprise a demodulator 1404 that can demodulate received symbols and provide them to a processor 1406 for evaluation. In addition, receiver 1402 can receive SFN data packets, synchronized among a plurality of transmitters and scheduled for transmission during a first allocation period, from one or more of the plurality of transmitters. Processor 1406 can be a processor dedicated to analyzing information received by receiver 1402 and/or generating information for transmission by a transmitter 1416. Additionally, processor 1406 can be a processor that controls one or more components of access terminal 1400, and/or a processor that analyzes information received by receiver 1402, generates information for transmission by transmitter 1416, and controls one or more components of access terminal 1400. Additionally, processor 1406 can execute instructions for analyzing SFN data received by receiver 1402, identifying lost SFN data packets, or determining whether a data packet is indecipherable as received, or for re-integrating a retransmitted SFN data packet within a previously received SFN transmission.

Access terminal 1400 can additionally comprise memory 1408 that is operatively coupled to processor 1406 and that may store data to be transmitted, received, and the like. Memory 1408 may store information related to transmission data packet scheduling (e.g., as indicated by allocation portion 1302 of FIG. 13, supra), protocols for evaluating the foregoing, protocols for identifying un-received portions of a transmission, for determining an indecipherable data packet, for transmitting a NACK request to an access point, and the like.

It will be appreciated that the data store (e.g., memory 1408) described herein can be either volatile memory or nonvolatile memory, or can include both volatile and non-volatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1408 of the subject systems and methods is intended to comprise, without being limited to, these and any other suitable types of memory.

Receiver 1402 is further operatively coupled to feedback analyzer 1410 that can provide feedback data related to a missing portion of a transmission (e.g. an un-received SFN data packet) or a portion of a transmission deemed indecipherable, to one or more of a plurality of access point transmitters. A data organizer 1412 can incorporate a subsequently received, missing portion of a transmission into previously received data associated with the transmission (e.g., a retransmitted SFN data packet can be re-incorporated into a prior SFN transmission Access terminal 1400 still further comprises a modulator 1414 and a transmitter 1416 that transmits the signal to, for instance, a base station, an access point, another access terminal, a remote agent, etc. Although depicted as being separate from the processor 1406, it is to be appreciated that signal generator 1410 and indicator evaluator 1412 may be part of processor 1406 or a number of processors (not shown).

Figure 15:
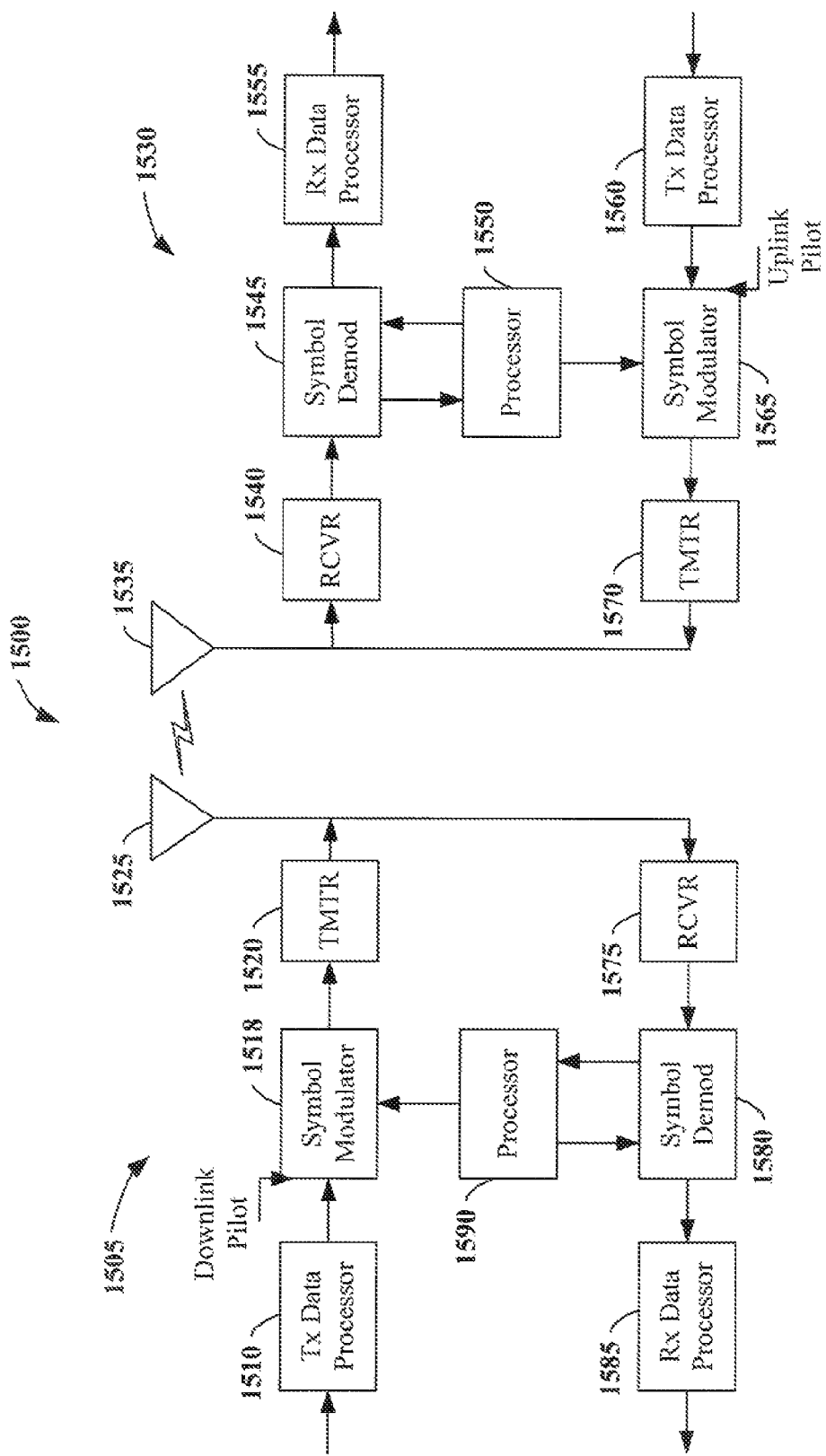
FIG. 15 illustrates a system that facilitates synchronized transmission of SFN data in conjunction with retransmission of un-received SFN data packets, in accordance with one or more aspects.

Referring now to FIG. 15, on a downlink, at access point 1505, a transmit (TX) data processor 1510 receives, formats, codes, interleaves, and modulates (or symbol maps) traffic data and provides modulation symbols ("data symbols"). A symbol modulator 1515 receives and processes the data symbols and pilot symbols and provides a stream of symbols. A symbol modulator 1520 multiplexes data and pilot symbols and provides them to a transmitter unit (TMTR) 1520. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1520 receives and converts the stream of symbols into one or more analog signals and further conditions (e.g. amplifies, filters, and frequency upconverts) the analog signals to generate a downlink signal suitable for transmission over the wireless channel. The downlink signal is then transmitted through an antenna 1525 to the terminals. At terminal 1530, an antenna 1535 receives the downlink signal and provides a received signal to a receiver unit (RCVR) 1540. Receiver unit 1540 conditions (e.g., filters, amplifies, and frequency downconverts) the received signal and digitizes the conditioned signal to obtain samples. A symbol demodulator 1545 demodulates and provides received pilot symbols to a processor 1550 for channel estimation. Symbol demodulator 1545 further receives a frequency response estimate for the downlink from processor 1550, performs data demodulation on the received data symbols to obtain data symbol estimates (which are estimates of the transmitted data symbols), and provides the data symbol estimates to an RX data processor 1555, which demodulates (i.e., symbol demaps), deinterleaves, and decodes the data symbol estimates to recover the transmitted traffic data. The processing by symbol demodulator 1545 and RX data processor 1555 is complementary to the processing by symbol modulator 1515 and TX data processor 1510, respectively, at access point 1505.

On the uplink, a TX data processor 1560 processes traffic data and provides data symbols. A symbol modulator 1565 receives and multiplexes the data symbols with pilot symbols, performs modulation, and provides a stream of symbols. A transmitter unit 1570 then receives and processes the stream of symbols to generate an uplink signal, which is transmitted by the antenna 1535 to the access point 1505.

At access point 1505, the uplink signal from terminal 1530 is received by the antenna 1525 and processed by a receiver unit 1575 to obtain samples. A symbol demodulator 1580 then processes the samples and provides received pilot symbols and data symbol estimates for the uplink. An RX data processor 1585 processes the data symbol estimates to recover the traffic data transmitted by terminal 1530. A processor 1590 performs channel estimation for each active terminal transmitting on the uplink. Multiple terminals may transmit pilot concurrently on the uplink on their respective assigned sets of pilot subbands, where the pilot subband sets may be interlaced.

Processors 1590 and 1550 direct (e.g., control, coordinate, manage, etc.) operation at access point 1505 and terminal 1530, respectively. Respective processors 1590 and 1550 can be associated with memory units (not shown) that store program codes and data. Processors 1590 and 1550 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, which may be digital, analog, or both digital and analog, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1590 and 1550.

Figure 16:
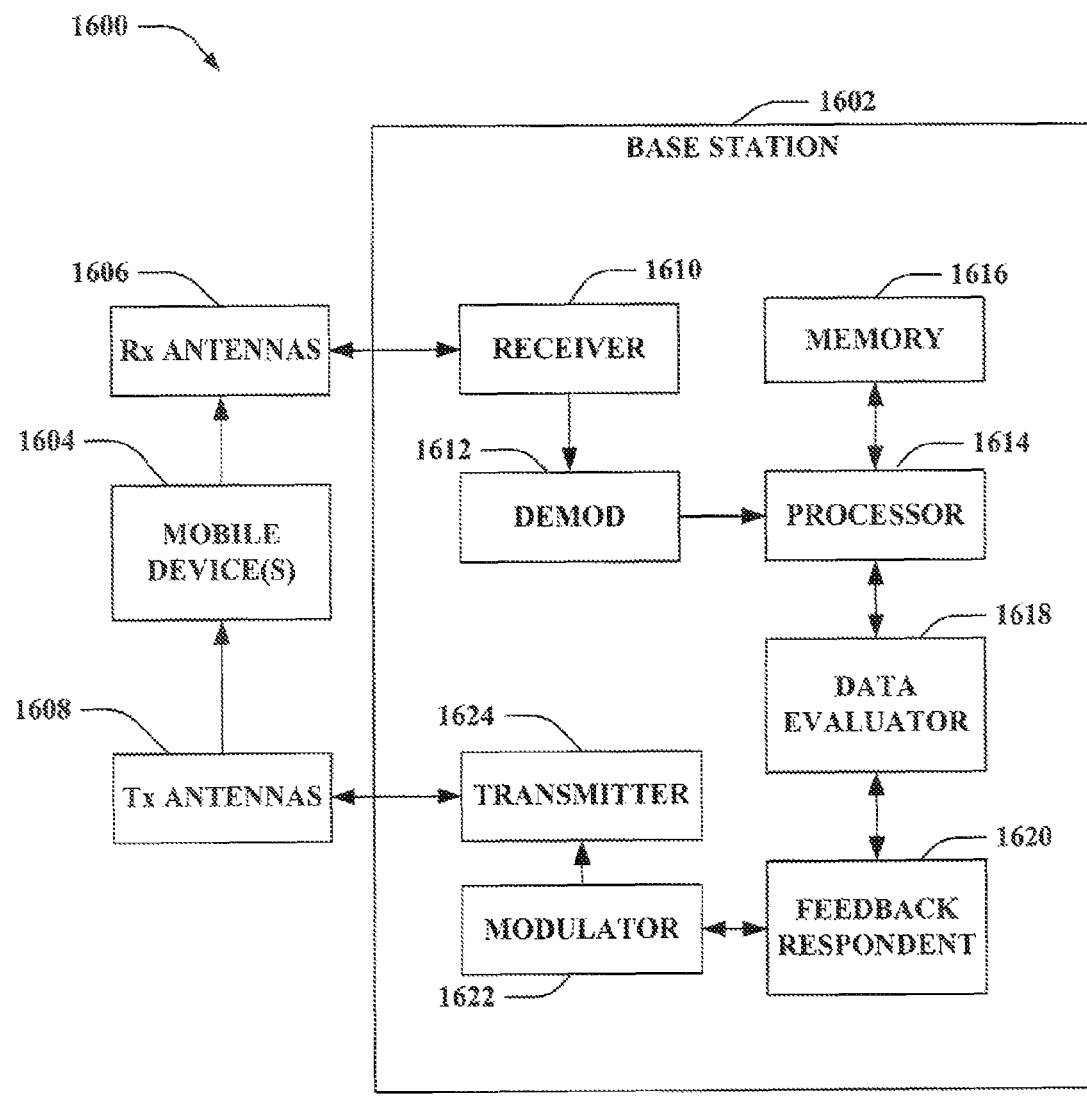
FIG. 16 illustrates a base station that facilitates retransmission of SFN data while preserving overall synchronization of SFN transmissions, in accordance with one or more aspects.

FIG. 16 is an illustration of a system 1600 that facilitates retransmission of SFN data in a manner that can maintain synchronized transmission of such data. System 1600 comprises a base station 1602 (e.g., access point, . . . ) with a receiver 1610 that receives signal(s) from one or more mobile devices 1604 through a plurality of receive antennas 1606, and a transmitter 1622 that transmits to the one or more mobile devices 1604 through a transmit antenna 1608. Receiver 1610 can receive information from receive antennas 1606 and can further comprise a signal recipient (not shown) that receives feedback data related to an un-received or indecipherable data packet. Additionally, receiver 1610 is operatively associated with a demodulator 1612 that demodulates received information. Demodulated symbols are analyzed by a processor 1614 that is coupled to a memory 1616 that stores information related to subdividing time and/or frequency portions of a transmission allocation period, re-allocating SFN or non-SFN segments to retransmission of un-received data, as well as data to be transmitted to or received from mobile device(s) 1604 (or a disparate base station (not shown)), and/or any other suitable information related to performing the various actions and functions set forth herein.

Processor 1614 is further coupled to a data evaluator 1618 that can synchronize and/or re-synchronize, as required, SFN data packets scheduled for transmission during an allocation period among a plurality of transmitters. Additionally, data evaluator 1618 can sub-divide an allocation period into time and/or frequency based sub-portions. For instance, data evaluator 1618 can separate a transmission frequency of at least a portion of an allocation period into a plurality of frequency sub-divisions that can transmit separate packets of data, or no data. Moreover, an allocation period can be separated into sub-periods by data evaluator 1618, where each sub-period can be allocated to a distinct block of data, or to no data, for instance.

Data evaluator 1618 can be further coupled to a feedback respondent 1620 that schedules retransmission of un-received or indecipherable data packets (e.g., SFN data), during a subsequent portion of an original allocation period, or during an allocation period subsequent an original allocation period. Additionally, such retransmission can be in a manner that maintains synchronized transmission of SFN data. For example, the feedback correspondent can re-allocate one or more sub-periods of an allocation period initially scheduled to transmit SFN data to the retransmission, and the data evaluator 1618 can re-synchronize SFN data for that allocation period. Alternatively, feedback correspondent 1620 can re-allocate one or more sub-periods of the allocation period initially scheduled to transmit non-SFN data or to transmit no data, to the retransmission. In such a case, retransmissions can be effectuated on a cell by cell basis from one or more base stations 1602.

It is to be understood that the embodiments described herein may be implemented in hardware, software, firmware, middleware, microcode, or any combination thereof For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Figure 17:
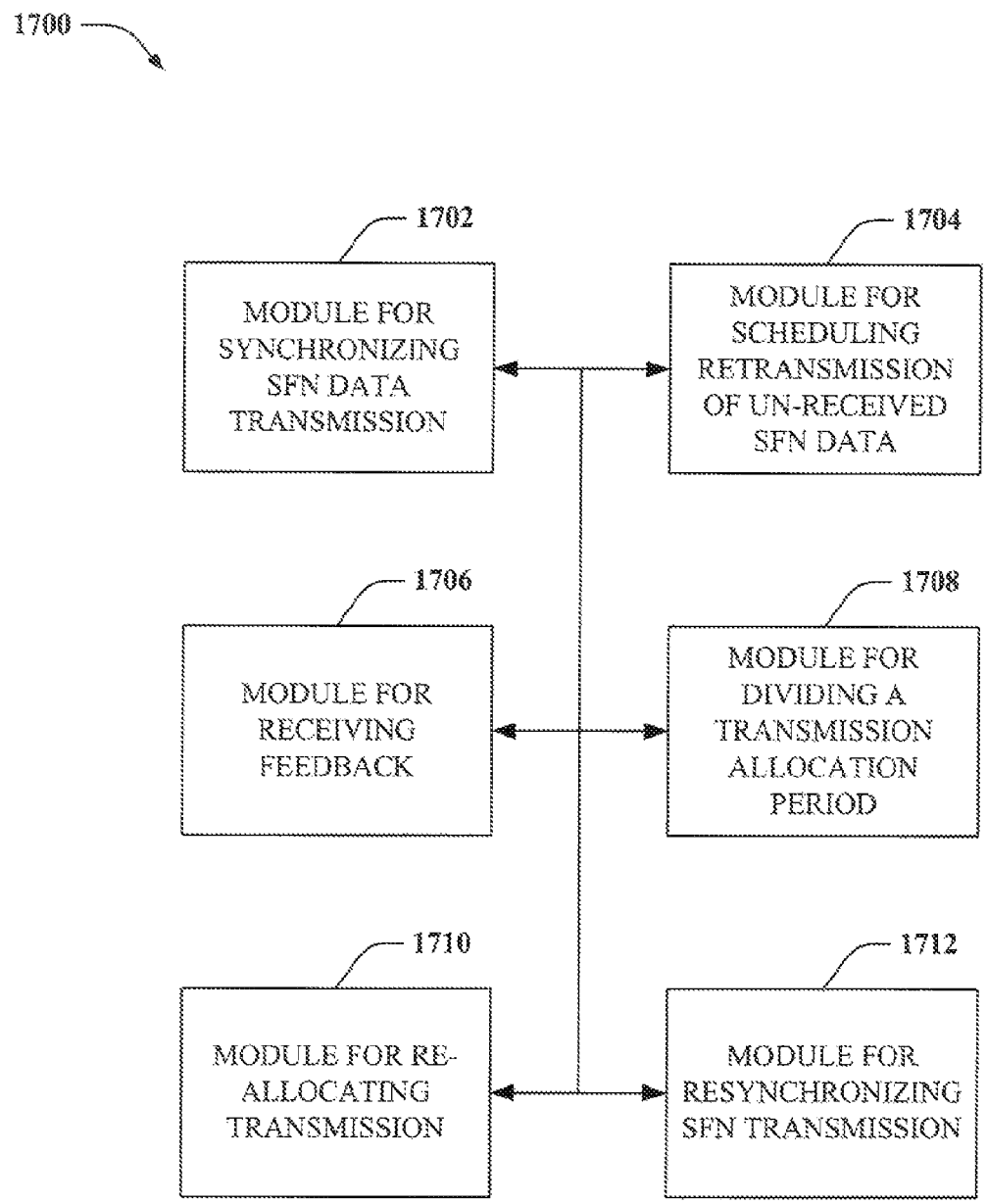
FIG. 17 illustrates an example system that provides retransmission of SFN data in a manner that maintains synchronization of SFN transmissions.

With reference to FIG. 17, illustrated is an example system 1700 that provides retransmission of SFN data in a manner that maintains synchronization of SFN transmissions. For example, system 1700 can reside at least partially within a wireless communication network and/or within a transmitter such as a node, base station, access point, or the like. It is to be appreciated that system 1700 is represented as including functional blocks, which may be functional blocks that represent functions implemented by a processor, software, or combination thereof (e.g., firmware).

System 1700 includes a module 1702 for synchronizing SFN data transmission. For example, the module 1702 can schedule a common block of data in a common portion of an allocation period, and can submit the allocation period to a plurality of transmitters that transmit the allocation period at a concurrent time. Module for synchronizing 1702 can interact with a module for scheduling retransmission of un-received SFN data 1704. Such retransmission can occur, for instance, in response to data related to an un-received or indecipherable SFN data packet provided by module for receiving feedback 1706. Such data can be transmitted by one or more terminal devices in contact with one or more of the plurality of transmitters.

In addition, module for scheduling 1704 can interface with a module for dividing a transmission allocation period 1708. Such a module 1708 can divide one or more portions of an allocation period into time and/or frequency based sub-divisions. Such sub-divisions can each include a block of data, such as the SFN data packet(s) scheduled by module for scheduling 1704. Further, module for re-allocating transmission 1710 can re-schedule a portion (e.g., sub-division provided by module for dividing 1708) of an allocation period to retransmission of the SFN data packet. More specifically, the module for re-allocating 1710 can re-schedule a portion of an allocation period scheduled for SFN transmission, for non-SFN transmission, or for transmission of no data to retransmission of the SFN data packet. Moreover, the latter two re-allocations can be done on a cell by cell basis. Re-allocating SFN blocks can require module for resynchronizing SFN transmission 1712 to re-synchronize data within the re-allocated period, so as to maintain overall synchronization of SFN data transmitted during that period.

Figure 18:
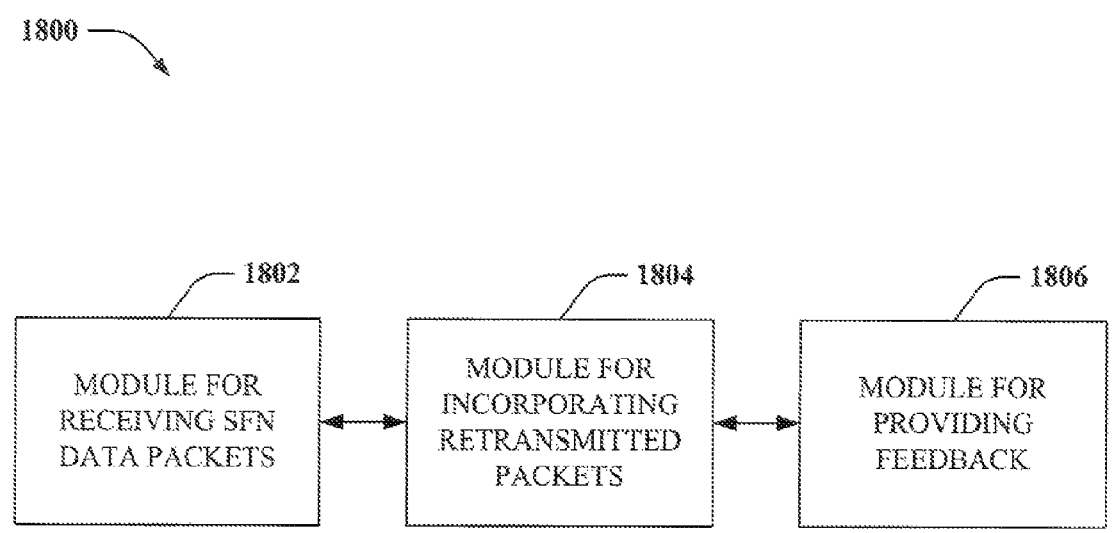
FIG. 18 depicts an example system that consumes retransmitted SFN data and can incorporate such data into a previously received SFN transmission in accord with one or more aspects.

With reference to FIG. 18, depicted is an example system 1800 that consumes retransmitted SFN data and can incorporate such data into a previously received SFN transmission in accord with one or more aspects. System 1800 may reside at least partially within a mobile device, for instance. As depicted, system 1800 includes functional blocks that may represent functions implemented by a processor, software, or combination thereof (e.g. firmware).

System 1800 can include a module for receiving SFN data packets 1802. Specifically, such SFN data packets can be synchronized among a plurality of transmitters and scheduled for transmission during an allocation period (e.g., a first or initial allocation period transmitting an original or initial stream of data) from one or more of the plurality of transmitters. In addition, module 1802 can interface with a module for incorporating retransmitted packets 1804. Such module 1804 can incorporate an un-received SFN data packet, associated with the SFN data packets received during the allocation period by the module for receiving 1802, and subsequently received during a subsequent portion of the allocation period or during a subsequent allocation period, into the SFN data packets received during the allocation period. In addition, system 1800 can include a module for providing feedback 1806, which can transmit feedback related to an un-received or indecipherable SFN data packet to one or more of the plurality of transmitters.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for providing retransmission of single frequency network (SFN) or multimedia/multicast single frequency network (MBSFN) data during a sequence of transmission allocation periods, each of the transmission allocation periods including segments respectively allocated to at least SFN data transmission and non-SFN data transmission, comprising:
    transmitting, during a first segment of one of the sequence of transmission allocation periods allocated to SFN data transmission, SFN data synchronized for transmission from each of a plurality of transmitters; and
    scheduling an un-received or indecipherable SFN data packet for retransmission during a second segment of the one of the transmission allocation periods or during a segment of a subsequent one of the sequence of transmission allocation periods.

2. The method of claim 1, comprising receiving feedback data related to the un-received or indecipherable SFN data packet associated with the SFN data.

3. The method of claim 2, wherein the feedback data is provided by a recipient of the SFN data transmission comprising one or more user devices that transmit the feedback data to one or more enhanced Node (eNode) base stations (Bs).

4. The method of claim 1, wherein the SFN data includes multimedia broadcast multicast service (MBMS) data, third generation partnership project for long term evolution MBMS (E-MBMS) data, multicast/broadcast single frequency network (MBSFN) data, or multimedia broadcast data, or combinations thereof.

5. The method of claim 1, comprising transmitting the SFN data packet during the second segment of the transmission allocation period or during the segment of the subsequent transmission allocation period.

6. The method of claim 1, wherein the plurality of transmitters is a plurality of eNode Bs.

7. The method of claim 1, wherein scheduling of the un-received or indecipherable SFN data packet is done in a manner that preserves synchronization of SFN data.

8. The method of claim 7, wherein synchronization of SFN data is preserved by selecting the second segment or the segment from a portion of the transmission allocation period or the subsequent transmission allocation period, respectively, scheduled to transmit non-SFN data, or to transmit no data.

9. The method of claim 7, wherein synchronization of SFN data is preserved by: selecting the second segment or the segment from at least a portion of the transmission allocation period or the subsequent transmission allocation period, respectively, that is scheduled to transmit the SFN data; and dynamically resynchronizing the SFN data among the plurality of transmitters.

10. The method of claim 2, wherein the segment of the subsequent transmission allocation period is scheduled after an initial point of the first segment of the transmission allocation period by a delay period that is greater than or equal to a time required to receive a request for retransmission related to the SFN data packet ($T_{NACK}$), plus a time required to schedule retransmission of the SFN data packet ($T_{SCH}$).

11. The method of claim 2, wherein the second segment is scheduled after an initial point of the first transmission allocation period by a time period that is greater than or equal to a time required to transmit SFN data during the first segment ($T_{SFN}$) plus a response time required to receive the feedback and reschedule the SFN data packet ($T_{RES}$).

12. The method of claim 1, comprising scheduling a plurality of retransmission blocks subsequent to the second segment for retransmission of additional un-received or indecipherable SFN data packets associated with the SFN data.

13. The method of claim 1, comprising dividing portions of the subsequent transmission allocation period into a plurality of frequency blocks, wherein the plurality of frequency blocks enable transmission of SFN data associated with an SFN service concurrent with retransmission of one or more un-received or indecipherable SFN data packets associated with the SFN service.

14. An apparatus that facilitates retransmission of single frequency network (SFN) data during a sequence of transmission allocation periods, each of the transmission allocation periods including segments respectively allocated to at least SFN data transmission and non-SFN data transmission, comprising:
    means for transmitting, during a first segment of a first of the sequence of transmission allocation periods allocated to SFN data transmission, SFN data packets synchronized for transmission by a plurality of transmitters; and
    means for scheduling retransmission of an un-received SFN data packet during a second segment of the first or a subsequent one of the sequence of transmission allocation periods in a manner that maintains synchronized SFN transmission.

15. The apparatus of claim 14, comprising means for receiving feedback data related to the un-received SFN data packet.

16. The apparatus of claim 15, comprising means for dividing the first and subsequent transmission allocation periods into time based sub-periods.

17. The apparatus of claim 16, wherein the un-received SFN data packet is scheduled during a sub-period of the subsequent allocation period that is separated from initial transmission of the first allocation period by a time period greater than or equal to $T_{NACK}+T_{SCH}$.

18. The apparatus of claim 16, comprising: means for re-allocating one or more sub-periods of the first or the subsequent transmission allocation period, allocated to transmission of SFN data, to retransmission of the un-received SFN data packet; and means for re-synchronizing the SFN data within the first or the subsequent transmission allocation period.

19. The apparatus of claim 16, wherein the un-received SFN data packet is scheduled during a sub-period of the first transmission allocation period that is subsequent to the start of the first transmission allocation period by a time greater than or equal to T $T_{SFN}+T_{RES}$.

20. The apparatus of claim 16, comprising means for re-allocating one or more sub-periods of the first or the subsequent transmission allocation period, allocated to transmission of non-SFN data or no data, to retransmission of the un-received SFN data packet.

21. The apparatus of claim 14, comprising means for frequency sub-division that subdivides a transmission frequency of at least a portion of the second allocation period into a plurality of frequency sub-divisions, at least one subdivision transmits the un-received SFN data packet.

22. The apparatus of claim 15, wherein the SFN data comprises multimedia broadcast multicast service (MBMS) data, third generation partnership project for long term evolution MBMS (E-MBMS) data, multicast/broadcast single frequency network (MBSFN) data, or multimedia broadcast data, or combinations thereof.

23. The apparatus of claim 14, wherein the plurality of transmitters is a plurality of enhanced Node (eNode) base stations (Bs).

24. The apparatus of claim 15, wherein the feedback data is provided by a recipient of the SFN data transmission.

25. The apparatus of claim 24, wherein the recipient of the SFN data transmission comprises one or more user devices that transmit the feedback data to one or more of the plurality of transmitters.

26. An apparatus that facilitates retransmission of single frequency network (SFN) data packets in a wireless network environment during a sequence of transmission allocation periods, each of the transmission allocation periods including segments respectively allocated to at least SFN data transmission and non-SFN data transmission, comprising:
    a data evaluator that schedules the SFN data packets for synchronized transmission during a first segment of a first of the sequence of transmission allocation periods; and
    a feedback respondent that schedules retransmission of an un-received SFN data packet during a second segment of the first or a subsequent one of the sequence of transmission allocation periods in a manner that maintains synchronized transmission of SFN data.

27. The apparatus of claim 26, comprising a signal recipient that receives feedback data related to the un-received SFN data packet.

28. The apparatus of claim 27, wherein the first and the subsequent transmission allocation periods are divided into sub-periods, each sub-period is allocated to a distinct block of data or allocated to no data.

29. The apparatus of claim 28, wherein the un-received SFN data packet is scheduled by the feedback respondent during one or more sub-periods of the subsequent allocation period that contain no data or non-SFN data, to preserve synchronization of SFN transmission during the subsequent allocation period.

30. The apparatus of claim 28, wherein the feedback respondent re-allocates one or more sub-periods of the first or the subsequent allocation period, allocated to transmission of SFN data, to retransmission of the un-received SFN data packet, wherein the data evaluator re-synchronizes SFN data within the first or the subsequent allocation period.

31. The apparatus of claim 26, wherein the SFN data comprises multimedia broadcast multicast service (MBMS) data, third generation partnership project for long term evolution MBMS (E-MBMS) data, multicast/broadcast single frequency network (MBSFN) data, or multimedia broadcast data, or combinations thereof.

32. The apparatus of claim 28, wherein the un-received SFN data packet is scheduled during a sub-period of the first transmission allocation period that is subsequent to the start of the first transmission allocation period by a time greater than or equal to $T_{SFN}+T_{RES}$.

33. The apparatus of claim 26, wherein the data evaluator separates a transmission frequency of at least a portion of the second allocation period into a plurality of frequency subdivisions, at least one subdivision transmits the un-received SFN data packet.

34. The apparatus of claim 28, wherein the un-received SFN data packet is scheduled during a sub-period of the subsequent allocation period that is separated from initial transmission of the first allocation period by a time period greater than or equal to $T_{NACK}+T_{SCH}$.

35. The apparatus of claim 26, wherein the plurality of transmitters is a plurality of enhanced Node (eNode) base stations (Bs).

36. The apparatus of claim 27, wherein the feedback data is provided by a recipient of the SFN data transmission.

37. The apparatus of claim 36, wherein the recipient of the SFN data transmission comprises one or more user devices that transmit the feedback data to one or more of the plurality of transmitters.

38. A processor for facilitating retransmission of data packets for a single frequency network (SFN) operating multimedia broadcast multicast service (MBMS) services during a sequence of transmission allocation periods, each of the transmission allocation periods including segments respectively allocated to at least SFN data transmission and non-SFN data transmission, comprising:
means for transmitting, during a first segment of a first of the sequence of transmission allocation periods allocated to SFN data transmission, SFN data packets synchronized for transmission by a plurality of transmitters; and
means for receiving feedback data related to an un-received SFN data packet; and
means for scheduling retransmission of the un-received SFN data packet during a second segment of the first or a subsequent one of the sequence of transmission allocation periods in a manner that maintains synchronized transmission of SFN data packets.

39. A computer program product for facilitating retransmission of single frequency network (SFN) data packets during a sequence of transmission allocation periods, each of the transmission allocation periods including segments respectively allocated to at least SFN data transmission and non-SFN data transmission, the computer program product comprising a non-transitory computer-readable medium including codes for causing a computer to:
transmit SFN data during a first segment of a first of the sequence of transmission allocation periods allocated to SFN data transmission, wherein the SFN data is synchronized for transmission by a plurality of transmitters;
receive feedback data related to an un-received or indecipherable SFN data packet associated with the SFN data; and
schedule the un-received or indecipherable SFN data packet for retransmission during a second segment of the first of the transmission allocation periods or a segment of a subsequent one of the sequence of transmission allocation periods in a manner that maintains synchronized transmission of SFN data.

40. A method for consuming retransmitted single frequency network (SFN) data in a wireless network environment during a sequence of transmission allocation periods, each of the transmission allocation periods including segments respectively allocated to at least SFN data transmission and non-SFN data transmission, comprising:
receiving SFN data, synchronized for transmission by two or more of a plurality of transmitters during a first segment of a first of the sequence of transmission allocation periods; and
incorporating an un-received or indecipherable SFN data packet, associated with SFN data transmitted during the first segment of the transmission allocation period, and subsequently received during a second segment of the first of the transmission allocation periods or a segment of a subsequent one of the sequence of transmission allocation periods, into the SFN data received during the first segment.

41. The method of claim 40, comprising providing feedback related to the un-received or indecipherable SFN data packet after receiving data transmitted during the segment of the transmission allocation period.

42. The method of claim 40, wherein the plurality of transmitters are enhanced Node (eNode) base stations (Bs).

43. The method of claim 40, wherein the SFN data includes multimedia broadcast multicast service (MBMS) data, third generation partnership project for long term evolution MBMS (E-MBMS) data, multicast/broadcast single frequency network (MBSFN) data, or multimedia broadcast data, or combinations thereof.

44. The method of claim 41, wherein an amount of time required to receive the un-received or indecipherable SFN data packet, after providing the feedback, is greater than or equal to a time for a protocol layer device of a wireless communication network to receive the feedback ($T_{REC}$), plus a time for the protocol device to reschedule the SFN data packet ($T_{SCH}$), plus a transmission time to receive the retransmitted data packet ($T_{TRAN}$).

45. An apparatus that consumes retransmitted single frequency network (SFN) data in a wireless network environment during a sequence of transmission allocation periods, each of the transmission allocation periods including segments respectively allocated to at least SFN data transmission and non-SFN data transmission, comprising:
means for receiving SFN data packets synchronized for transmission by two or more of a plurality of transmitters during a first segment of a first of the sequence of transmission allocation periods; and
means for incorporating an un-received SFN data packet, associated with the SFN data packets received during the first of the sequence of transmission allocation periods, and subsequently received during a subsequent portion of the first of the sequence of transmission allocation periods or during a subsequent one of the sequence of transmission allocation periods, into the SFN data packets received during the first of the sequence of transmission allocation periods.

46. The apparatus of claim 45, comprising means for providing feedback related to the un-received or indecipherable SFN data packet that transmits the feedback to one or more of the plurality of transmitters.

47. The apparatus of claim 45, wherein the plurality of transmitters are enhanced Node (eNode) base stations (Bs).

48. The method of claim 45, wherein the SFN data includes multimedia broadcast multicast service (MBMS) data, third generation partnership project for long term evolution MBMS (E-MBMS) data, multicast/broadcast single frequency network (MBSFN) data, or multimedia broadcast data, or combinations thereof.

49. The method of claim 46, wherein an amount of time required to receive the un-received or indecipherable SFN data packet, after transmitting the feedback, is greater than or equal to a time for a protocol layer device of a wireless communication network to receive the feedback ($T_{REC}$), plus a time for the protocol device to reschedule the SFN data packet ($T_{SCH}$), plus a transmission time to receive the retransmitted data packet ($T_{TRAN}$).

50. An apparatus that consumes retransmitted single frequency network (SFN) data during a sequence of transmission allocation periods, each of the transmission allocation periods including segments respectively allocated to at least SFN data transmission and non-SFN data transmission, comprising:
   a receiver that receives SFN data packets synchronized for transmission by two or more of a plurality of transmitters during a first segment of a first of the sequence of transmission allocation periods; and
   a data organizer that incorporates an un-received SFN data packet, associated with the SFN data packets transmitted during the first of the sequence of transmission allocation periods, and subsequently received at the receiver during a subsequent portion of the first of the sequence of transmission allocation periods or during a subsequent one of the sequence of transmission allocation periods, into the SFN data packets received at the receiver during the first of the sequence of transmission allocation periods.

51. The apparatus of claim 50, comprising a feedback analyzer that provides feedback related to the un-received or indecipherable SFN data packet to at least one of the plurality of transmitters.

52. The apparatus of claim 50, wherein the plurality of transmitters are enhanced Node (eNode) base stations (Bs).

53. The method of claim 50, wherein the SFN data includes multimedia broadcast multicast service (MBMS) data, third generation partnership project for long term evolution MBMS (E-MBMS) data, multicast/broadcast single frequency network (MBSFN) data, or multimedia broadcast data, or combinations thereof.

54. The method of claim 51, wherein an amount of time required to receive the un-received or indecipherable SFN data packet at the receiver, after the device transmitter provides the feedback, is greater than or equal to a time for a protocol layer device of a wireless communication network to receive the feedback ($T_{REC}$) from the device transmitter, plus a time for the protocol device to reschedule the SFN data packet ($T_{SCH}$), plus a transmission time for the receiver to receive the retransmitted data packet ($T_{TRAN}$).

55. A processor for consuming retransmitted single frequency network (SFN) data packets during a sequence of transmission allocation periods, each of the transmission allocation periods including segments respectively allocated to at least SFN data transmission and non-SFN data transmission, comprising:
   means for receiving SFN data packets synchronized for transmission by two or more of a plurality of transmitters during a first segment of a first of the sequence of transmission allocation periods;
   means for providing feedback data related to an un-received SFN data packet; and
   means for incorporating the un-received SFN data packet, received during a subsequent portion of the first of the sequence of transmission allocation periods or during a subsequent one of the sequence of transmission allocation periods, into the SFN data packets received during the first of the sequence of transmission allocation periods.

56. A computer program product for a device that consumes retransmitted single frequency network (SFN) data packets during a sequence of transmission allocation periods, each of the transmission allocation periods including segments respectively allocated to at least SFN data transmission and non-SFN data transmission, the computer program product comprising a non-transitory computer-readable medium including codes for causing a computer to:
   receive SFN data packets synchronized for transmission by two or more of a plurality of transmitters during a first segment of a first of the sequence of transmission allocation periods;
   provide feedback data related to an un-received or indecipherable SFN data packet; and
   incorporate the un-received SFN data packet received during a subsequent portion of the first of the sequence of transmission allocation periods or during a subsequent one of the sequence of transmission allocation periods, into the SFN data packets received during the first of the sequence of transmission allocation periods.

57. The method of claim 1, wherein the scheduling an un-received or indecipherable SFN data packet for retransmission is done without performing synchronization of the retransmission between the plurality of transmitters.

58. The method of claim 1, further comprising providing an electronic copy of a transmission allocation period to the plurality of transmitters.

59. The method of claim 1, wherein the un-received or indecipherable SFN data packet is re-allocated to a first time based sub-period immediately prior to a second time-based sub-period allocated to related SFN data.

60. The method of claim 1, wherein the un-received or indecipherable SFN Data packet is re-allocated to a second time based sub-period immediately subsequent to a first time-based sub-period allocated related SFN data.

61. The method of claim 41, wherein the feedback is generated by analyzing one or more pertinent services and one or more not-pertinent services and providing the feedback based only on the pertinent services.

* * * * *